United States Patent
Yoon et al.

(10) Patent No.: US 11,729,799 B2
(45) Date of Patent: Aug. 15, 2023

(54) ELECTRONIC DEVICE AND METHOD, PERFORMED BY ELECTRONIC DEVICE, OF OBTAINING LOCATION INFORMATION

(71) Applicant: Samsung Electronics Co., Ltd., Gyeonggi-do (KR)

(72) Inventors: Kangjin Yoon, Gyeonggi-do (KR); Mingyu Lee, Gyeonggi-do (KR); Taeyoung Ha, Gyeonggi-do (KR)

(73) Assignee: Samsung Electronics Co., Ltd

( * ) Notice: Subject to any disclaimer, the term of this patent is extended or adjusted under 35 U.S.C. 154(b) by 6 days.

(21) Appl. No.: 17/353,220

(22) Filed: Jun. 21, 2021

(65) Prior Publication Data

US 2022/0061043 A1 Feb. 24, 2022

(30) Foreign Application Priority Data

| Aug. 21, 2020 | (KR) | 10-2020-0105683 |
| Sep. 15, 2020 | (KR) | 10-2020-0118498 |
| Nov. 20, 2020 | (KR) | 10-2020-0156923 |

(51) Int. Cl.

| *H04W 72/04* | (2023.01) |
| *H04W 4/029* | (2018.01) |
| *H04W 4/02* | (2018.01) |
| *H04W 72/12* | (2023.01) |
| *G01S 5/10* | (2006.01) |
| *G01S 5/02* | (2010.01) |
| *H04W 72/51* | (2023.01) |
| *H04W 72/0446* | (2023.01) |
| *H04W 72/1263* | (2023.01) |

(52) U.S. Cl.
CPC ........... *H04W 72/51* (2023.01); *G01S 5/0284* (2013.01); *G01S 5/10* (2013.01); *H04W 4/023* (2013.01); *H04W 4/029* (2018.02); *H04W 72/0446* (2013.01); *H04W 72/1263* (2013.01)

(58) Field of Classification Search
CPC ........... H04W 72/048; H04W 72/0446; H04W 4/029; H04W 72/7263; H04W 4/023; G01S 5/0284

See application file for complete search history.

(56) References Cited

U.S. PATENT DOCUMENTS

| 9,237,546 B1 | 1/2016 | Zhang et al. | |
| 2008/0069008 A1* | 3/2008 | Park | H04W 64/00 370/254 |
| 2009/0149198 A1* | 6/2009 | Nam | G01S 5/0294 455/456.2 |
| 2010/0157810 A1 | 6/2010 | Oh et al. | |

(Continued)

FOREIGN PATENT DOCUMENTS

| WO | WO-2017196583 A2 * | 11/2017 | .............. G01S 11/16 |
| WO | WO-2018172721 A1 * | 9/2018 | ......... G01S 13/0209 |

OTHER PUBLICATIONS

International Search Report dated Sep. 14, 2021 issued in counterpart application No. PCT/KR2021/006728, 3 pages.

*Primary Examiner* — Muthuswamy G Manoharan
(74) *Attorney, Agent, or Firm* — The Farrell Law Firm, P.C.

(57) ABSTRACT

Provided is a method, performed by an electronic device, of obtaining location information. In detail, provided is a method, performed by an electronic device, of obtaining relative location information with respect to anchor devices by wirelessly communicating with the anchor devices.

16 Claims, 20 Drawing Sheets

(56) References Cited

U.S. PATENT DOCUMENTS

| | | |
|---|---|---|
| 2012/0252503 A1 | 10/2012 | Wu et al. |
| 2014/0035732 A1* | 2/2014 | Karr .................... G01S 13/825 340/10.5 |
| 2015/0156746 A1 | 6/2015 | Horne et al. |
| 2019/0219665 A1 | 7/2019 | Ye et al. |
| 2019/0317183 A1 | 10/2019 | Kamarainen |

* cited by examiner

FIG. 5C $$\circ \; \alpha' - \delta' = (\iota + b - a)/C + \beta - (\iota + a - b)/C$$
$$- \gamma = 2(b-a)/C + \beta - \gamma$$
$$\rightarrow b - a = (\alpha' - \delta' - (\beta - \gamma)) * C/2$$
$$\rightarrow b - a = ((\alpha - \delta) * \frac{\tau + \gamma}{\alpha + \delta} - (\beta - \gamma)) * C/2$$

| Parameter | | Size (bits) | Notes |
|---|---|---|---|
| Length | | 11 | Size of Content field |
| Group ID | | 4 | 2 = Vendor Specific Nested IE |
| Type | | 1 | 1 = Payload IE |
| Content | Vendor OUI | 24 | TBD = Samsung OUI |
| | UWB message ID | 4 | TBD = Ranging Initiation Message |
| | Ranging device management list length | 4 | Number of elements in the ranging device management list field |
| | Ranging device management list | **24\*N | N number of Ranging device management list elements** |

| Parameter | Size (bits) | Notes |
|---|---|---|
| Ranging slot index | 8 | Assigned slot |
| Address | 16 | Address of responder |

| Parameter | | Size (bits) | Notes |
|---|---|---|---|
| Length | | 11 | Size of Content field |
| Group ID | | 4 | 2 = Vendor Specific Nested IE |
| Type | | 1 | 1 = Payload IE |
| Content | Vendor OUI | 24 | TBD = Samsung OUI |
| | UWB message ID | 4 | TBD = Ranging Response Message |
| | Reserved | 4 | RFU |
| | Reply time | 32 | Reply time of the responder |

| Parameter | | Size (bits) | Notes |
|---|---|---|---|
| Length | | 11 | Size of Content field |
| Group ID | | 4 | 2 = Vendor Specific Nested IE |
| Type | | 1 | 1 = Payload IE |
| Content | Vendor OUI | 24 | TBD = Samsung OUI |
| | UWB message ID | 4 | TBD = Ranging Final Message |
| | Reply time list length | 4 | Number of elements in the Reply time list field |
| | First round-trip time | 32 | Round-trip time for the first responder |
| | Reply time list | 48∗N | N number of Reply time list elements |

○ Anchor A – Anchor B drift difference
• Measurement
  ➤ $\beta_n' = \tau_n - 2 * \iota/c$
  ➤ $\gamma_n' = \theta_n - 2 * \iota/c$
• Estimation
  ➤ $D_{n,1} = \beta_n'/\beta_n$
  ➤ $D_{n,2} = \gamma_n/\gamma_n'$

FIG. 13

| Parameter | | Size (bits) | Notes |
|---|---|---|---|
| Length | | 11 | Size of Content field |
| Group ID | | 4 | 2 = Vendor Specific Nested IE |
| Type | | 1 | 1 = Payload IE |
| Content | Vendor OUI | 24 | TBD = Samsung OUI |
| | UWB message ID | 4 | TBD = Ranging Initiation Message |
| | Ranging device management list length | 4 | Number of elements in the ranging device management list field |
| | Ranging device management list | 24*N | N number of Ranging Device Management List elements |
| | Information of Initiator | TBD | Location information of Initiator |

| Parameter | | Size (bits) | Notes |
|---|---|---|---|
| Length | | 11 | Size of Content field |
| Group ID | | 4 | 2 = Vendor Specific Nested IE |
| Type | | 1 | 1 = Payload IE |
| Content | Vendor OUI | 24 | TBD = Samsung OUI |
| | UWB message ID | 4 | TBD = Ranging Response Message |
| | Reserved | 4 | RFU |
| | Reply time | 32 | Reply time of the responder |
| | Information of Responder | TBD | Location information of Responder |

| Parameter | | Size (bits) | Notes |
|---|---|---|---|
| Length | | 11 | Size of Content field |
| Group ID | | 4 | 2 = Vendor Specific Nested IE |
| Type | | 1 | 1 = Payload IE |
| Content | Vendor OUI | 24 | TBD = Samsung OUI |
| | UWB message ID | 4 | TBD = Ranging Final Message |
| | Reply time list length | 4 | Number of elements in the Reply time list field |
| | First round-trip time | 32 | Round-trip time for the first responder |
| | Reply time list | 48*N | N number of Reply time list elements |
| | Information of Initiator | TBD | Location information of Initiator |

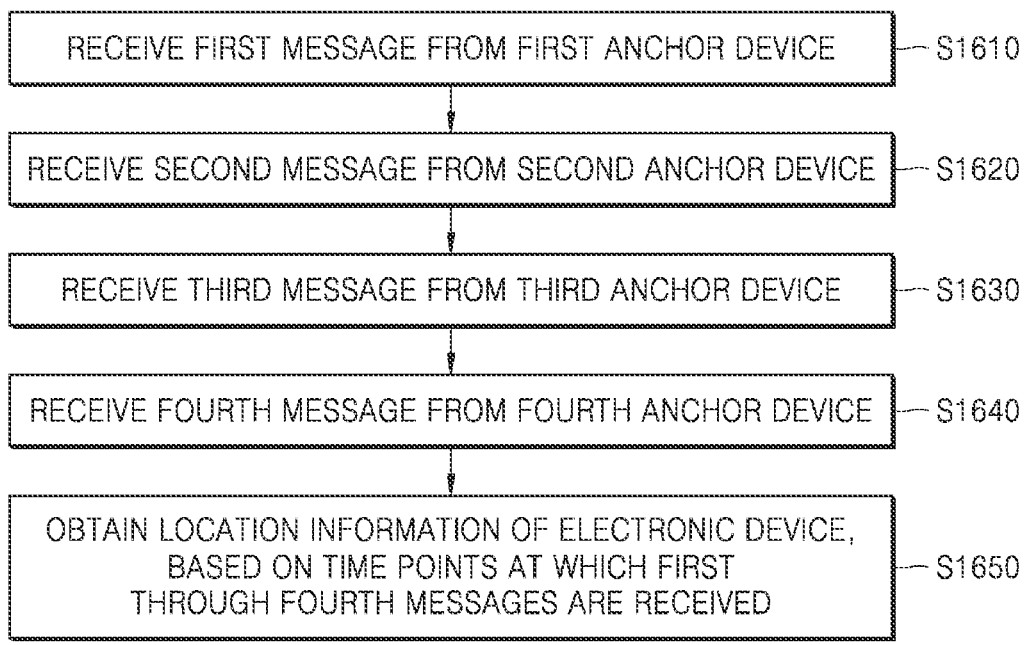

FIG. 18C

- Unkown values: $d_1, d_2, d_3, d_4, R$;
- TDoA equations:
  $(t_2-t_1-S) * R = (d_2-d_1)/C$
  $(t_3-t_1-2S) * R = (d_3-d_1)/C$
  $(t_4-t_1-3S) * R = (d_4-d_1)/C$
- Reducing unknown values:
  $d_1 = \sqrt{(x_M-x_1)^2 + (y_M-y_1)^2}$
  $d_2 = \sqrt{(x_M-x_2)^2 + (y_M-y_2)^2}$
  $d_3 = \sqrt{(x_M-x_3)^2 + (y_M-y_3)^2}$
  $d_4 = \sqrt{(x_M-x_4)^2 + (y_M-y_4)^2}$
- New TDoA equations:
  $(t_2-t_1-S) * R = f'(x_M, y_M)$
  $(t_3-t_1-S) * R = f''(x_M, y_M)$
  $(t_4-t_1-S) * R = f'''(x_M, y_M)$

⟩ 1815

ELECTRONIC DEVICE AND METHOD, PERFORMED BY ELECTRONIC DEVICE, OF OBTAINING LOCATION INFORMATION

CROSS-REFERENCE TO RELATED APPLICATION(S)

This application is based on and claims priority under 35 U.S.C. § 119 to Korean Patent Application Nos. 10-2020-0105683, 10-2020-0118498, and 10-2020-0156923, filed on Aug. 21, 2020, Sep. 15, 2020, and Nov. 20, 2020, respectively, in the Korean Intellectual Property Office, the disclosures of which are incorporated by reference herein in their entireties.

BACKGROUND

1. Field

The disclosure relates generally to a method, performed by an electronic device, of obtaining location information, and more particularly, to a method, performed by an electronic device, of obtaining relative location information with respect to anchor devices by wirelessly communicating with the anchor devices.

2. Description of Related Art

The Internet is evolving to an Internet of things (IoT) network where distributed entities or things send, receive and process information without human intervention. Internet of everything (IoE) technologies combined with IoT, such as big data processing technologies through connection with a cloud server have also emerged. To realize the IoT, technology elements, such as sensing technologies, wired or wireless communication and network infrastructure, service interface technologies, and security technologies, are required. Recently, technologies including sensor networks for connection between things, machine to machine (M2M) communication, and machine type communication (MTC) have been studied.

An IoT environment may provide intelligent Internet technology (IT) services that create new value in human life by collecting and analyzing data generated by connected things. The IoT may be applied to a variety of areas, such as smart homes, smart buildings, smart cities, smart cars or connected cars, smart grid, health care, smart home appliances and advanced medical services through convergence and combination between existing information technologies and various industrial applications.

With the development of wireless communication systems, it is possible to provide various services, for which there exists a need for a method to provide the services effectively. For example, in medium access control (MAC), a ranging technique for measuring a distance between electronic devices by using ultra wide band (UWB) may be used. The UWB is a wireless communication technique that uses a very wide frequency range greater than or equal to several gigahertz (GHz) in a base band, without using a wireless carrier wave. For example, a UWB ranging technique may be used in a factory or a company for a system for tracking the locations of human staff or products or for an indoor navigation system.

SUMMARY

Accordingly, the present disclosure provides embodiments that are designed to address at least the problems and/or disadvantages described above and to provide at least the advantages described below.

An aspect of the disclosure is to provide an electronic device for performing wireless communication with anchor devices and a method, performed by the electronic device, of obtaining location information without the reliance on messages from master and initiator devices, in a system for obtaining the location information of the electronic device.

According to an aspect of the disclosure, a method, performed by an electronic device, of obtaining location information includes receiving an initiation message transmitted from a first anchor device; receiving information about a first reply time of a second anchor device from the second anchor device, the information about the first reply time includes information about a time interval between a time point at which the second anchor device receives the initiation message and a time point at which the second anchor device transmits a response message; receiving, from the first anchor device, information about a second reply time with respect to the second anchor device, the information about the second reply time includes information about a time interval between a time point at which the first anchor device receives the response message and a time point at which the first anchor device transmits a final message; and based on information about a time point at which the electronic device receives at least one of the initiation message, the response message, or the final message, the information about the first reply time, and the information about the second reply time, obtaining information about a difference between a first distance between the first anchor device and the electronic device and a second distance between the second anchor device and the electronic device.

According to another aspect of the disclosure, an electronic device includes a communicator; a memory; and at least one processor configured to control an operation of the electronic device by executing a program stored in the memory, wherein the communicator is configured to receive an initiation message transmitted form a first anchor device; receive, from a second anchor device, information about a first reply time of the second anchor device, the information about the first reply time includes information about a time interval between a time point at which the second anchor device receives the initiation message and a time point at which the second anchor device transmits a response message; and receive information about a second reply time with respect to the second anchor device, the information about the second reply time includes information about a time interval between a time point at which the first anchor device receives the response message and a time point at which the first anchor device transmits a final message; and wherein the at least one processor is configured to obtain information about a difference between a first distance between the first anchor device and the electronic device and a second distance between the second anchor device and the electronic device, based on information about a time point at which at least one of the initiation message, the response message, or the final message is received, the information about the first reply time, and the information about the second reply time.

According to another aspect of the disclosure, a computer-readable recording medium has recorded thereon a program for causing an electronic device to perform a method of obtaining location information, the method including receiving an initiation message broadcast from a first anchor device; receiving a response message broadcast from a second anchor device in response to the initiation message, wherein the response message includes a first reply time of the second anchor device; receiving a final message broadcast from the first anchor device, wherein the final message includes a second reply time with respect to the second anchor device; and obtaining information about a difference between a first distance between the first anchor device and the electronic device and a second distance between the second anchor device and the electronic device, based on the initiation message, the response message, and the final message.

According to another aspect of the disclosure, a method, performed by an electronic device, of obtaining location information, includes receiving a first message from a first anchor device; receiving a second message from a second anchor device; receiving a third message from a third anchor device; receiving a fourth message from a fourth anchor device; and obtaining the location information of the electronic device based on time points at which the electronic device receives the first through fourth messages, respectively.

According to another aspect of the disclosure, an electronic device includes a communicator; a memory; and at least one processor configured to execute a program stored in the memory to: receive a first message from a first anchor device; receive a second message from a second anchor device; receive a third message from a third anchor device; receive a fourth message from a fourth anchor device; and control an operation of the electronic device such that the electronic device obtains location information of the electronic device based on time points at which the electronic device receives the first through fourth messages.

According to another aspect of the disclosure, a method, performed by an electronic device, of obtaining location information, includes determining a ranging method for obtaining the location information of the electronic device, based on a number of messages received from a first anchor device and a total number of messages received from a plurality of anchor devices including the first anchor device; when the determined ranging method is a first ranging method, obtaining the location information of the electronic device based on time points at which an initiation message, a first response message, a second response message, and a final message are received from the first anchor device, a second anchor device, a third anchor device, and the first anchor device, respectively; and when the determined ranging method is a second ranging method, obtaining the location information of the electronic device based on time points at which a first message, a second message, a third message, and a fourth message are received from the first anchor device, the second anchor device, the third anchor device, and the fourth anchor device, respectively.

According to another aspect of the disclosure, an electronic device includes a communicator; a memory; and at least one processor configured to execute a program stored in the memory to: determine a ranging method for obtaining location information of the electronic device, based on a number of messages received from a first anchor device and a total number of messages received from a plurality of anchor devices including the first anchor device; when the determined ranging method is a first ranging method, obtain the location information of the electronic device based on time points at which an initiation message, a first response message, a second response message, and a final message are received from the first anchor device, a second anchor device, a third anchor device, and the first anchor device, respectively; and when the determined ranging method is a second ranging method, obtain the location information of the electronic device based on time points at which a first message, a second message, a third message, and a fourth message are received from the first anchor device, the second anchor device, the third anchor device, and the fourth anchor device, respectively.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5C illustrates a detailed calculation process used by an electronic device to obtain location information of the electronic device with respect to anchor devices, according to an embodiment;

FIG. 7A illustrates a format of an initiation message transmitted by an initiator anchor device, according to an embodiment;

FIG. 7B illustrates a format of a device management list element included in an initiation message, according to an embodiment;

FIG. 8 illustrates a format of a response message transmitted by a responder anchor device, according to an embodiment;

FIG. 9A illustrates a format of a final message transmitted by an initiator anchor device, according to an embodiment;

FIG. 13 illustrates a format of an initiation message transmitted by an initiator anchor device, according to an embodiment;

FIG. 14 illustrates a format of a response message transmitted by a responder anchor device, according to an embodiment;

FIG. 15 illustrates a format of a final message transmitted by an initiator anchor device, according to an embodiment;

FIG. 16 is a method of an electronic device, according to an embodiment;

FIG. 18C illustrates a detailed calculation process used by an electronic device to obtain location information of the electronic device with respect to anchor devices, according to an embodiment;

DETAILED DESCRIPTION

Figure 1:
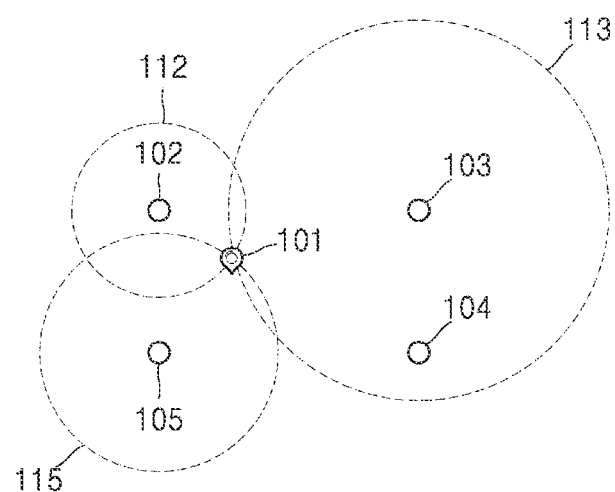
FIG. 1 illustrates a general method, performed by an electronic device positioning system, of using time of arrival (ToA) for obtaining location information of an electronic device, to which the disclosure is applied.

Hereinafter, embodiments of the disclosure will be described in detail with reference to the accompanying drawings. However, the disclosure may have different forms and should not be construed as being limited to the embodiments described herein. Detailed descriptions of known functions and/or configurations will be omitted for the sake of clarity and conciseness.

The terms used in the embodiments are selected from among common terms that are currently widely used, in consideration of their function in the embodiments. However, the terms may vary according to an intention of one of ordinary skill in the art, currently or with the advent of new technology. Therefore, the terms used in the embodiments should not be interpreted merely as the terms, but the terms should be interpreted based on the meaning of the terms and content throughout the embodiments.

It will be understood that, although the terms such as first, and second may be used herein to describe various elements, these elements should not be limited by these terms. These terms are only used to distinguish one element from another.

The terms used in this specification are merely used to describe the embodiments and are not aimed to limit the embodiments. As used herein, the singular forms "a," "an" and "the" are intended to include the plural forms as well, unless the context clearly indicates otherwise. Throughout the specification, when a part is referred to as being "connected" to other parts, the part may be "directly connected" to the other parts or may be "electrically connected" to the other parts with other devices therebetween. When a part "includes" a certain element, unless it is specifically mentioned otherwise, the part may further include another component and may not exclude the other component.

The term "the" and other similar terms used throughout this specification may refer to both singular and plural elements. Also, unless orders of operations for describing the method according to embodiments are clearly described, the operations may be performed in appropriate orders. The disclosure is not limited to the described orders of the operations.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

The expression "according to an embodiment" or the like, described in various parts of this specification does not necessarily refer to the same element as one another.

An embodiment of the disclosure may be described as functional block components and various processing operations. All or part of such functional blocks may be implemented with any number of hardware and/or software components configured to perform specified functions. For example, the functional blocks of the disclosure may be implemented with one or more micro-processors or with circuit components for predetermined functions. The functional blocks of the disclosure may be implemented with various programming or scripting languages. The functional blocks may be implemented with algorithms executed by one or more processors. Furthermore, the disclosure may employ related techniques for electronic settings, signal processing and/or data control.

Furthermore, the connecting lines or connectors shown in the drawings are intended to represent example functional relationships and/or physical or logical couplings between the various elements. It should be noted that many alternative or additional functional relationships, physical connections or logical connections may be present in a practical device.

In general, wireless sensor network techniques are mainly divided into a wireless local area network (WLAN) technique and a wireless personal area network (WPAN) technique according to a range of recognition. WLAN, which is based on IEEE 802.11, is a technique for accessing a backbone network around a radius of 100 m. Also, WPAN, which is based on IEEE 802.15, includes Bluetooth™, ZigBee™, ultra wide band (UWB), etc. Wireless networks in which the wireless network techniques are realized may be composed of a plurality of communication electronic devices. Here, the plurality of communication electronic devices may perform communication in an active period by using a single channel. That is, the communication electronic devices may collect a packet and transmit the collected packet in the active period.

UWB may denote a short-range high speed wireless communication technique using a wide frequency range greater than or equal to several GHz, low spectrum density, and a narrow pulse width (about 1 to about 4 nanoseconds (nsec)), in a base band status. Also, UWB may directly denote a range, in which the UWB communication is implemented. Hereinafter, a ranging method among electronic devices will be described based on a UWB communication method. However, this is only an example, and in reality, various wireless communication techniques may be used.

Electronic devices according to embodiments may include a stationary terminal or a mobile terminal, realized by a computer device, and may communicate with other devices and/or servers using wireless or wired communication methods. For example, the electronic devices may include, but are not limited to, a smart phone, a mobile terminal, a laptop computer, a digital broadcasting terminal, a personal digital assistant (PDA), a portable multimedia player (PMP), a navigation device, a slate personal computer (PC), a tablet PC, a desktop computer, a digital television (TV), a refrigerator, an artificial intelligence (AI) speaker, a wearable device, a projector, a smart key, a smart car, a printer, and the like.

Device-to-device (D2D) communication refers to a method of direct communication between geographically nearby electronic devices by using no infrastructures such as a base station. Various embodiments relate to MAC based on the D2D communication, and for the MAC, a distance between electronic devices may have to be measured. A UWB ranging technique may be used to measure the distance between the electronic devices.

UWB ranging methods according to various embodiments may be used for various location-based services. A location-based service denotes a service provided based on a location of a moving object. For example, a UWB ranging technique may be used for a system for tracking a location of a human staff or a product in a factory or a company, an indoor navigation system, a smart gate system, a smart pay system, an athlete motion analysis, or the like. A positioning system may include a ranging system. Users of devices providing the location-based service may be able to know where they are, which points of interest (PIO) are near to them, or how they are to reach destinations.

The UWB ranging technique for positioning an electronic device may be related to a message exchange between a plurality of anchor devices, whose locations are pre-known, and the electronic device. The locations of the plurality of anchor devices may be delivered to the electronic device though out-of-band wireless communication or may be pre-stored in the electronic device. For example, the ranging system may use a ToA or TDoA method.

FIG. 1 illustrates a general method, performed by an electronic device positioning system, of obtaining location information of an electronic device 101 by using ToA, to which the disclosure is applied.

The ToA method is a simple and general ranging technique. The ToA method may be based on a time point at which a signal is transmitted from an electronic device 101 (for example, a target device, a location of which is to be identified) or a reference point (for example, an anchor device), a time point at which the signal arrives, and a speed by which the signal is transmitted, such as the speed of light.

The system illustrated in FIG. 1 may obtain a distance between the electronic device 101 and a predetermined anchor device by using a time in which a signal, transmitted by the electronic device 101, arrives at the predetermined anchor device or a time in which a signal, transmitted by the predetermined anchor device, arrives at the electronic device 101. The positioning system may identify the location of the electronic device 101 based on distances between the electronic device 101 and a plurality of anchor devices 102, 103, 104, and 105.

Referring to FIG. 1, the positioning system may determine an intersection point of a spherical surface 113 having a distance between the electronic device 101 and an anchor device 103 as a radius, a spherical surface 112 having a distance between the electronic device 101 and an anchor device 102 as a radius, and a spherical surface 115 having a distance between the electronic device 101 and an anchor device 105 as a radius, as the location of the electronic device 101.

Hereinafter, the ToA may refer to a time in which a signal from a device arrives at another device or a ranging method measuring a distance between devices based on a time in which a signal from a device arrives at another device.

Figure 2:
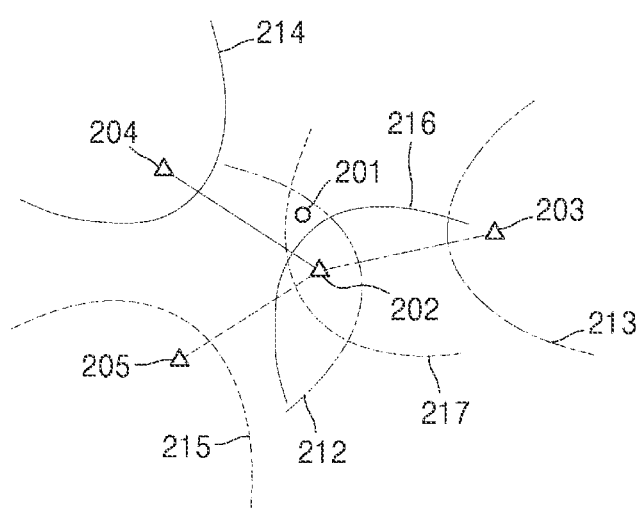
FIG. 2 illustrates a general method, performed by an electronic device positioning system, of using time difference of arrival (TDoA) for obtaining location information of an electronic device, to which the disclosure is applied.

FIG. 2 illustrates a general method, performed by an electronic device positioning system, of using TDoA to obtain location information of an electronic device 201, to which the disclosure is applied.

Like the ToA, the TDoA is also a general ranging technique. However, compared to the ToA, the TDoA may be more versatile. The TDoA method may not require a time point at which a signal is transmitted and may be based on a time point at which a signal is received by the electronic device 201 or a predetermined anchor device or a speed by which the signal is transmitted, such as the speed of light.

The system illustrated in FIG. 2 may obtain a difference between an arrival time between the electronic device 101 and a predetermined anchor device and an arrival time between the electronic device 101 and another predetermined anchor device, based on a time in which a signal, transmitted by the electronic device 201, arrives at each of the predetermined anchor devices or a time in which a signal, transmitted by each of the predetermined anchor devices, arrives at the electronic device 201. The positioning system may obtain a difference in distance between the electronic device 201 and each of the plurality of anchor devices, based on the difference between the arrival times of the electronic device 201 and the plurality of anchor devices. The positioning system may identify the location of the electronic device 201 based on the difference in distance between the electronic device 201 and each of the plurality of anchor devices.

Referring to FIG. 2, the positioning system may determine an intersection point of hyperbolic surfaces 212 and 213, hyperbolic surfaces 214 and 216, and hyperbolic surfaces 215 and 217 as the location of the electronic device 201, wherein the hyperbolic surfaces 212 and 213 have focal points corresponding to a location of an anchor device 202 and a location of an anchor device 203, the hyperbolic surfaces 214 and 216 have focal points corresponding to the location of the anchor device 202 and a location of an anchor device 204, and the hyperbolic surfaces 215 and 217 have focal points corresponding to the location of the anchor device 202 and a location of an anchor device 205.

Hereinafter, the TDoA may refer to a difference between arrival times between devices or may refer to a ranging method measuring a distance between devices based on a difference between arrival times between the devices.

The positioning system may use a downlink method or an uplink method.

Figure 3:
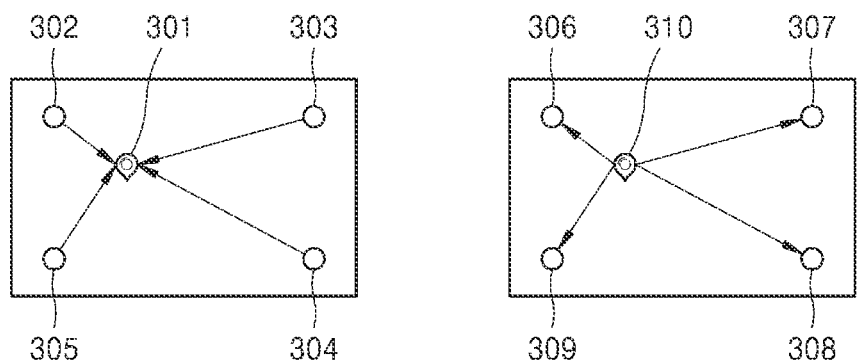
FIG. 3 illustrates a general method, performed by an electronic device positioning system, of obtaining location information of an electronic device, to which the disclosure is applied.

FIG. 3 illustrates a general method, performed by an electronic device positioning system, of obtaining location information of an electronic device 301, to which the disclosure is applied.

As illustrated in FIG. 3, a positioning system using a downlink method may identify the location of the electronic device 301 based on signals transmitted from anchor devices 302, 303, 304, and 305 to the electronic device 301. The electronic device 301 may directly calculate the location thereof, i.e., its own location.

The positioning system using the downlink method may have scalability having no limit in the number target devices, whose locations are to be identified. The positioning system may be advantageous for privacy protection because a target device directly calculates a location thereof, and the positioning system may be capable of in-band clock synchronization. The positioning system using the downlink method may be used for an indoor navigation system.

As illustrated in FIG. 3, however, a positioning system using an uplink method may identify the location of the electronic device 310 based on signals transmitted from the electronic device 310 to anchor devices 306, 307, 308, and 309. Infrastructure devices (for example, the anchor devices 306, 307, 308, and 309) may calculate the location of the electronic device 310.

The positioning system using the uplink method may not require a target device whose location is to be identified to maintain a stand-by status for receiving a signal, and thus, may have low power consumption. The positioning system using the uplink method may be used for location tracking of an asset/patients, foot traffic analytics, and shopping behavior analytics, as examples.

Electronic devices according to embodiments may identify locations thereof, i.e., their own locations, by overhearing messages between anchor devices. The electronic devices may perform the location identification by using a downlink TDoA method.

Timings and functions of message transmission of anchor devices (namely, an initiator anchor device and a responder anchor device) may be pre-configured before a ranging operation. The anchor devices may perform two types of functions. One function may be a role of an initiator and the other function may be a role of a responder. An anchor device having the role of the initiator may start a TDoA ranging round, and an anchor device having the role of the responder may respond thereto. The TDoA ranging round may correspond to a completion of a cycle in which TDoA messages are exchanged. The electronic device may receive ranging messages from the initiator anchor device and the responder anchor device and may measure a TDoA. In order to determine a two-dimensional (2D) location, the electronic device may have to measure at least three TDoAs. The electronic device may estimate a location thereof, based on measuring of TDoAs and predetermined locations of the anchor devices.

The anchor device may perform double sided-two way ranging (DS-TWR) and may be configured through out-of-band (wired or wireless) communication. The anchor device may compensate for a clock offset or estimate a clock drift with respect to another anchor device. For example, a basic cell may be composed of one initiator anchor device and at least three responder anchor devices, and a plurality of cells may be included in a general system.

The initiator anchor device may control a TDoA round by transmitting a ranging initiation message (RIM) to the responder anchor devices, such as by unicasting, multicasting, or broadcasting the RIM. The initiator anchor device may have a list of responder anchor devices that are included in a cell, to which the initiator anchor device belongs. After the initiator anchor device receives ranging response messages (RRMs) from the responder anchor devices, the initiator anchor device may transmit a ranging final message (RFM) to the responder anchor devices.

During the TDoA round, the responder anchor device may operate in a manner configured by the initiator anchor device through the RIM The responder anchor device may respond to the RIM from the initiator anchor device by transmitting the RRM in a ranging slot assigned to the responder anchor device. After the responder anchor device receives the RFM from the initiator anchor device, the responder anchor device may compensate for a clock of the responder anchor device to be fit for a clock of the initiator anchor device.

The electronic device may receive the ranging messages (for example, the RIM, the RRM, and the RFM) from the initiator anchor device and the responder anchor devices and may measure times for which the ranging messages are received. The electronic device may identify locations of the disposed anchor devices through in-band or out-of-band communication. The electronic device may calculate the location of the electronic device by measuring TDoAs and using the locations of the anchor devices.

The electronic device may receive ranging messages from the anchor devices and measure a time difference between timings in which the electronic device receives the ranging messages within a TDoA round. When the electronic device receives a total set (that is, an RIM, an RRM, and an RFM) of ranging messages, the electronic device may calculate a location of the electronic device based on values directly measured by the electronic device and measurement data obtained based on the received messages.

One of the anchor devices used to identify the location of the electronic device may function as an initiator, and the others may function as responders. An anchor device having performed as the initiator during a predetermined TDoA round may perform as the responder in other TDoA rounds. Hereinafter, an example in which the electronic device observes signal exchanges between two anchor devices will be described. However, the disclosure is not limited thereto. In order for the electronic device to identify a 2D or a three-dimensional (3D) location thereof, signal exchanges among at least four or at least five anchor devices may have to be required.

Figure 4:
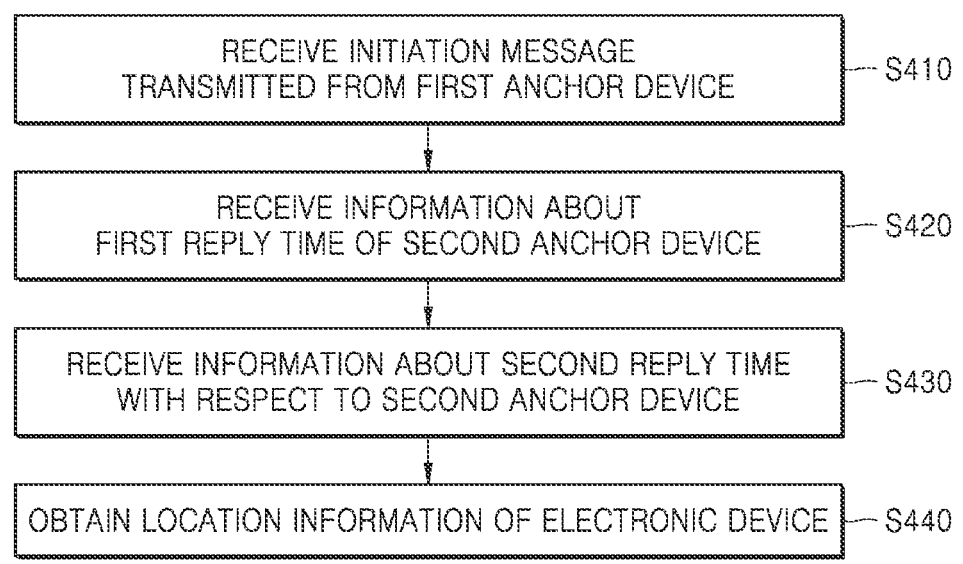
FIG. 4 is a method of an electronic device, according to an embodiment.

FIG. 4 is a method of an electronic device, according to an embodiment of the disclosure.

The electronic device may obtain location information of the electronic device by observing signal exchanges among a plurality of nearby anchor devices. Hereinafter, a first anchor device may be an initiator anchor device, and a second anchor device and a third anchor device may be responder anchor devices.

In step S410, the electronic device may receive an initiation message transmitted from the first anchor device. The first anchor device according to an embodiment of the disclosure may transmit the initiation message to the electronic device by unicasting, multicasting, or broadcasting the initiation message.

For example, a ranging system including the electronic device may perform a ranging operation through in-band scheduling. When the in-band scheduling is used, the ranging system may not include a backend controller. The initiation message may include a slot index, which is used by the second anchor device to transmit a response message, as scheduling information. The initiation message may further include an address of at least one anchor device including the second anchor device and information about a slot index assigned to the at least one anchor device identified by the address.

As another example, the ranging system including the electronic device may perform the ranging operation by using external scheduling information. In this case, the ranging system may include a backend controller configured to provide the scheduling information. The initiation message, the response message, and the final message may be scheduled by the backend controller. Thus, the initiation message may not include an address of an anchor device and information about a slot index assigned to the anchor device identified by the address.

In step S420, the electronic device may receive information about a first reply time of the second anchor device, from the second anchor device. The information about the first reply time may include information about a time between a time point at which the second anchor device receives the initiation message and a time point at which the second anchor device transmits the response message.

The second anchor device may receive the initiation message and transmit the response message in response to the initiation message. The second anchor device may transmit the response message to the electronic device by unicasting, multicasting, or broadcasting the response message.

The electronic device may receive the response message that the second anchor device transmits in response to the initiation message.

For example, the electronic device may receive the response message of the second anchor device, the response message including the information about the first reply time of the second anchor device. As another example, the response message may include a scrambled timestamp sequence (STS) and may not include the information about the first reply time. In this case, the information about the first reply time may be transmitted to the electronic device by being included in an additional message that is different from the response message.

In step S430, the electronic device may receive information about a second reply time with respect to the second anchor device, from the first anchor device. The information about the second reply time may include information about a time between a time point at which the first anchor device receives the response message and a time point at which the first anchor device transmits a final message.

The first anchor device may receive the response message and transmit the final message. The first anchor device may transmit the final message to the electronic device by unicasting, multicasting, or broadcasting the final message.

The electronic device may receive the final message transmitted by the first anchor device.

For example, the electronic device may receive, from the first anchor device, the final message that includes the second reply time with respect to the second anchor device. As another example, the final message may include an STS and may not include the information about the second reply time. In this case, the information about the second reply time may be transmitted to the electronic device by being included in an additional message that is different from the final message.

The electronic device may further receive information about a round-trip time of the first anchor device.

For example, the electronic device may receive the final message including the information about the round-trip time of the first anchor device with respect to the second anchor device. However, the disclosure is not limited thereto, and the information about the round-trip time of the first anchor device with respect to the second anchor device may be transmitted by being included in an additional message that is different from the final message. The round-trip time of the first anchor device with respect to the second anchor device may denote a time between the time point at which the first anchor device transmits the initiation message and the time point at which the first anchor device receives the response message from the second anchor device.

As another example, the electronic device may receive the final message including information about a round-trip time of the first anchor device with respect to the third anchor device and may calculate a round-trip time of the first anchor device with respect to the second anchor device based on the round-trip time of the first anchor device with respect to the third anchor device. However, the disclosure is not limited thereto, and the information about the round-trip time of the first anchor device with respect to the third anchor device may be transmitted to the electronic device by being included in an additional message that is different from the final message.

The third anchor device may have transmitted the response message in response to the initiation message earliest from among the plurality of anchor devices having received the initiation message transmitted by the first anchor device. The round-trip time of the first anchor device with respect to the third anchor device may denote a time between the time point at which the first anchor device transmits the initiation message and a time point at which the first anchor device receives the response message from the third anchor device.

The electronic device may calculate a round-trip time of the first anchor device with respect to another anchor device by using the round-trip time of the first anchor device with respect to the third anchor device, a reply time with respect to the third anchor device, and a reply time with respect to the other anchor device. For example, the electronic device may calculate a round-trip time of the first anchor device with respect to the second anchor device by subtracting the reply time with respect to the second anchor device from a sum of the round-trip time of the first anchor device with respect to the third anchor device and the reply time with respect to the third anchor device.

In step S440, the electronic device may obtain information about a difference between a first distance between the first anchor device and the electronic device and a second distance between the second anchor device and the electronic device. The electronic device may obtain the location information of the electronic device based on the difference between the first distance and the second distance. The electronic device according to an embodiment of the disclosure may obtain the information about the difference between the first distance and the second distance, based on information about a time point at which at least one of the initiation message, the response message, or the final message is received, the information about the first reply time, and the information about the second reply time.

In order to obtain the information about the difference between the first distance and the second distance, the electronic device may calculate a TDoA between a time in which a message arrives at the electronic device from the first anchor device and a time in which a message arrives at the electronic device from the second anchor device.

The TDoA may be calculated based on the first reply time of the second anchor device, the round-trip time of the first anchor device, a difference between a time point at which the electronic device receives the initiation message and a time point at which the electronic device receives the response message, the second reply time of the first anchor device, and a difference between a time point at which the electronic device receives the response message and a time point at which the electronic device receives the final message.

In order to obtain the information about the difference between the first distance and the second distance, the electronic device may calculate the difference between the first distance and the second distance, by performing compensation based on a clock of one of the electronic device, the first anchor device, and the second anchor device.

Based on an interval of transmission of the initiation message, the electronic device may perform compensation on a measurement value to be fit for a clock of the initiator anchor device. The electronic device may calculate the information about the difference between the first distance and the second distance by performing compensation based on a ratio between an interval by which the first anchor device transmits the initiation message and an interval by which the second anchor device receives the initiation message. The interval by which the first anchor device transmits the initiation message may be measured by using the clock of the first anchor device, and the interval by which the second anchor device receives the initiation message from the first anchor device may be measured by using the clock of the second anchor device.

The electronic device may receive the location information of at least one of the first anchor device or the second anchor device, and based on the received location information, may obtain the information about the difference between the first distance and the second distance. For example, at least one of the initiation message or the final message transmitted by the first anchor device may include the location information of the first anchor device. The response message transmitted by the second anchor device may include the location information of the second anchor device.

Figure 5A:
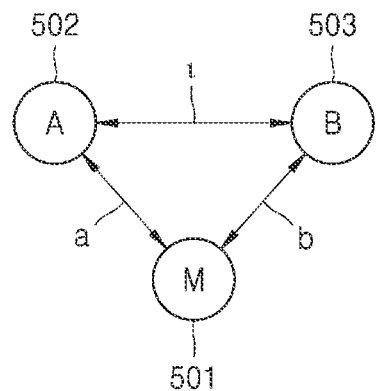
FIG. 5A illustrates one or more components of an electronic device positioning system according to an embodiment.

FIG. 5A illustrates one or more components of an electronic device positioning system according to an embodiment.

The electronic device positioning system in FIG. 5A may include anchor device A 502, anchor device B 503, and an electronic device (or a mobile device (M)) 501. In FIG. 5A, "l" may indicate a distance between anchor device A 502 and anchor device B 503, "a" may indicate a distance between anchor device A 502 and the electronic device M 501, and "b" may indicate a distance between anchor device B 503 and the electronic device M 501.

The electronic device M 501 may calculate a difference between the distance between anchor device A 502 and the electronic device M 501 and the distance between anchor device B 503 and the electronic device M 501, based on a TDoA between a time in which a signal arrives at the electronic device M 501 from anchor device A 502 and a time in which a signal arrives at the electronic device M 501 from anchor device B 503.

Figure 5B:
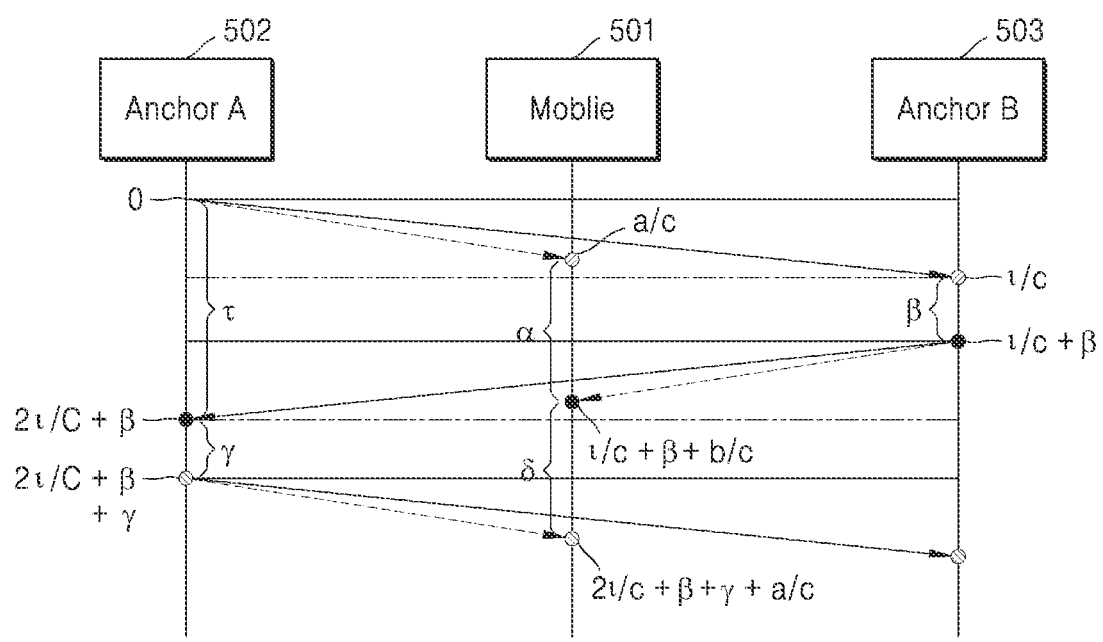
FIG. 5B illustrates information used by an electronic device to obtain location information of the electronic device with respect to anchor devices, according to an embodiment.

In FIGS. 5A through 5C, for convenience of explanation, an example in which the electronic device M 501 calculates the TDoA with respect to the two anchor devices 502 and 503 is illustrated. However, embodiments are not limited thereto. The electronic device M 501 may identify the location of the electronic device 501 based on TDoAs measured by observing signal exchanges among at least three anchor devices. In order for the electronic device M 501 to identify a 3D location of the electronic device M 501, TDoAs among at least four anchor devices or at least five anchor devices may have to be required.

FIG. 5B illustrates information used by the electronic device 501 to obtain the location information of the electronic device 501 with respect to the anchor devices 502 and 503, according to an embodiment.

In FIG. 5B, it may be assumed that anchor device A 502 operates as an initiator anchor device and a master anchor device. The master anchor device may be an anchor device configured to control ranging among a plurality of slave anchor devices and an electronic device (or a target device), included in an electronic positioning system. The master anchor device may be an anchor device capable of performing both an initiator role and a responder role. The slave anchor device may be an anchor device configured to perform only a responder role.

Anchor device A 502 may initiate ranging by transmitting an RIM based on scheduling information.

Referring to FIG. 5B, when a time point at which anchor device A 502 transmits the RIM is 0, a time point at which the RIM arrives at the electronic device 501 may be a/c. In a/c, a may indicate a distance between anchor device A 502 and the electronic device 501, and c may indicate a speed by which the signal is transmitted. A time point at which the RIM arrives at anchor device B 503 may be l/c. In l/c, l may indicate a distance between anchor device A 502 and anchor device B 503, and c may indicate a speed by which the signal is transmitted.

The anchor devices may identify whether the anchor devices have to transmit an RRM, a slot that is used to transmit the RRM, and when an RFM has to be transmitted, by referring to the scheduling information in the RIM.

Anchor device B 503 having received the RIM may transmit an RRM in a slot assigned to anchor device B 503, based on the scheduling information. Referring to FIG. 5B, β may indicate a reply time corresponding to a time interval between a time point at which anchor device B 503 receives the RIM and a time point at which anchor device B 503 transmits the RRM in response to the RIM. The RRM may be transmitted by including information about the reply time β.

When the time point at which anchor device B 503 transmits the RRM is l/c+β, a time point at which the RRM arrives at the electronic device 501 may be l/c+β+b/c. In b/c, b may indicate a distance between anchor device B 503 and the electronic device 501, and c may indicate a speed by which the signal is transmitted. Also, a time point at which the RRM arrives at anchor device A 502 may be l/c+β+l/c=2l/c+β.

Anchor device A 502 having received the RRM may finish ranging by transmitting an RFM. Referring to FIG. 5B, γ may indicate a reply time corresponding to a time interval between the time point at which anchor device A 502 receives the RRM and a time point at which anchor device A 502 transmits the RFM. The RFM may be transmitted by including information about the reply time γ and a round-trip time τ.

When the time point at which anchor device A 502 transmits the RFM is 2l/c+β+γ, a time point at which the RFM arrives at the electronic device 501 may be 2l/c+β+γ+a/c. A time point at which the RFM arrives at anchor device B 503 may be 2f/c+β+γ+l/c=3l/c+β.

As illustrated in FIG. 5B, the electronic device 501 may overhear the transmitted RIM, RRM, and RFM and determine a TDoA curve. The electronic device 501 may obtain a TDoA result by repeatedly performing the calculation process illustrated in FIG. 5C on signals received from at least three anchor devices. The electronic device 501 may obtain relative locations of the electronic device 501 with respect to the anchor devices, based on the TDoA result.

An application installed in the electronic device 501 may obtain a location of the electronic device 501 based on the TDoA result by identifying each anchor device related to a message through MAC information address included in the message.

FIG. 5C illustrates a detailed calculation process 505 used by the electronic device 501 to obtain location information of the electronic device 501 with respect to the anchor devices 502 and 503, according to an embodiment.

In FIG. 5B, a time interval between a time point at which the electronic device 501 receives an RIM and a time point at which the electronic device 501 receives an RRM may be measured to be α, and a time interval between the time point at which the electronic device 501 receives the RRM and a time point at which the electronic device 501 receives an RFM may be measured to be δ.

A clock of the electronic device 501 or a clock of each of the anchor devices 502 and 503 may not always operate at precisely the same speed, and thus, a clock drift may occur. For example, a clock drift may occur when an oscillator generating the clock is minutely affected by a temperature or pressure change.

Thus, for accurate ranging, the electronic device 501 or each anchor device 502 or 503 may compensate for the clock drift by changing a clock speed based on a difference between the clock speeds of devices. For example, the clock drift may be compensated for by using a voltage control method.

Since a time measurement value may be changed because of a clock difference between devices, for the accurate ranging, a process of compensating for an error due to the clock drift among the devices may have to be required. The electronic device 501 or each anchor device 502 or 503 may sense a difference between clock speeds of the devices and may compensate for a measured value based on the sensed difference between the clock speeds of the devices in order to compensate for the error due to the clock drift.

When $\alpha$ and $\delta$ are values measured based on the clock of the electronic device 501, $\alpha'$ and $\delta'$ of FIG. 5C may be values obtained by compensating for the values $\alpha$ and $\delta$ measured based on the clock of the electronic device 501 to be synchronized with the clock of anchor device A 502.

An error due to a drift between the clock of the electronic device 501 and the clock of anchor device A 502 may be compensated for by using a ratio $(\tau+\gamma)/(\alpha+\delta)$ between $\tau+\gamma$ corresponding to a time interval between a time point at which anchor device A 502 transmits the RIM and a time point at which anchor device A 502 transmits the RFM and $\alpha+\delta$ corresponding to a time interval between a time point at which the electronic device 501 receives the RIM and a time point at which the electronic device 501 receives the RFM.

$\alpha'$ may be calculated based on Equation [1], as follows:

$$(l/c+\beta+b/c)-a/c=(l+b-a)/c+\beta \quad [1]$$

$\delta'$ may be calculated based on Equation [2], as follows:

$$(2l/c+\beta+\gamma+a/c)-(l/c+\beta+b/c)=(l+a-b)/c-\gamma. \quad [2]$$

Thus, $\alpha'-\delta'$ may be calculated as illustrated in FIG. 5C.

In FIG. 5C, a detailed calculation process of obtaining a distance difference b-a between anchor devices A and B 502 and 503 and the electronic device 501 based on Equation [3], as follows:

$$\alpha'-\delta'=2(b-a)/c+\beta-\gamma \quad [3]$$

Equation [3] is described based on time values measured by the electronic device 501, is additionally illustrated.

FIG. 5C illustrates an example of compensating for only an error due to a clock drift between the electronic device 501 and anchor device A 502. However, there may be an error due to a drift between the clock of anchor device A 502 and the clock of anchor device B 503. The error due to the clock drift between anchor device A 502 and anchor device B 503 may be compensated for through wireless/wired communication. For example, a measured value may be compensated for within 0.1 parts per million (ppm) with respect to a clock difference between the anchor devices. The compensation of the error due to the clock drift between the anchor devices will be described in detail below with reference to FIGS. 11A, 11B, and 12.

Figure 6:
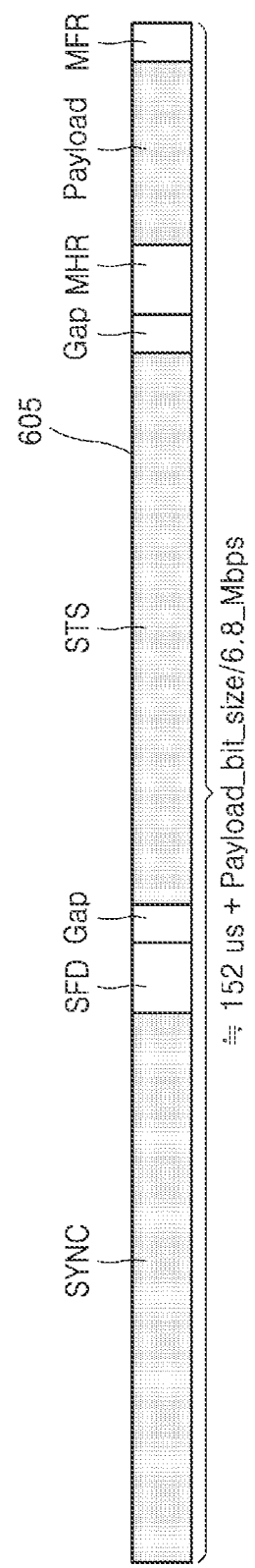
FIG. 6 illustrates a structure of a message transmitted by an anchor device, according to an embodiment.

FIG. 6 illustrates a structure of a message 605 transmitted by an anchor device, according to an embodiment.

A message 605 transmitted and received to and from devices may correspond to an SP1 message including a unique static STS with respect to a least significant bit (LBS), as illustrated in FIG. 6.

FIG. 7A illustrates a format of an initiation message 710 transmitted by an initiator anchor device, according to an embodiment.

As illustrated in FIG. 7A, a payload IE of a first message (that is, an RIM) 710 transmitted by the initiator anchor device may be composed of 6+3*N bytes.

The RIM 710 may include a length field indicating a size of a content field, a group identification (ID) field indicating a vendor specific nested IE, a type field indicating a payload IE, and the content field. The content field of the RIM 710 may include a ranging device management list length field and a ranging device management list field. The ranging device management list length field may be composed of 4 bits and may indicate the number (N) of elements in the ranging device management list field. When the ranging device management list field includes N ranging device management list elements, the ranging device management list field may be composed of 24*N bits. The ranging device management list field may include a ranging device management element for each anchor device participating in the ranging.

The content field of the RIM 710 is not limited to the example illustrated in FIG. 7A and may further include at least one of a message control field or a round index field.

The message control field may indicate a structure of a message. The message control field may include information about the number of elements in the ranging device management list field, whether a block index field is present in the message, whether a round index field is present in the message, and whether a slot index is present in the message.

The round index field may indicate an index of a current TDoA round. Nearby master anchor devices having received the RIM may calculate their RIM transmission timings by using the round index field. Electronic devices having received the RIM may calculate their start timings and exit timings of a power saving mode by using the round index field.

FIG. 7B illustrates a format of the ranging device management list element 720 included in an initiation message, according to an embodiment.

As illustrated in FIG. 7B, one ranging device management list element 720 included in the ranging device management list field may include a ranging slot index field and an address field and may be composed of 24 bits.

The ranging slot index field may indicate an index of a slot assigned to be used by a responder anchor device identified through the address field to transmit a response message. The address field may indicate an address to identify each responder anchor device. The address field may include MAC address information of each responder anchor device.

FIG. 8 illustrates a format of a response message 810 transmitted by a responder anchor device, according to an embodiment.

As illustrated in FIG. 8, a payload IE of a second message (that is, an RRM) 810 transmitted by the responder anchor device in response to the RIM may be composed of 10 bytes.

The RRM 810 may include a length field indicating a size of a content field, a group ID field indicating a vendor specific nested IE, a type field indicating a payload IE, and the content field. The content field of the RRM may include a reply time field. The reply time field may be composed of 32 bits and may indicate a reply time of the responder anchor device. The reply time of the responder anchor device may denote a time interval between a time point at which the responder anchor device receives the RIM from the initiator anchor device and a time point at which the responder anchor device transmits the RRM.

The content field of the RRM according to an embodiment of the disclosure is not limited to the example illustrated in FIG. 8 and may further include a message control field.

The message control field may indicate a structure of a message. The message control field may include information about whether a hopping mode is used, whether a round index field is present in the message, a length of a round-trip time list, and whether a reply time field is present in the message.

FIG. 9A illustrates a format of a final message 910 transmitted by the initiator anchor device, according to an embodiment.

As illustrated in FIG. 9A, a payload IE of a third message (that is, an RFM) 910 transmitted by the initiator anchor device may be composed of 10+6*N bytes.

The RFM 910 may include a length field indicating a size of a content field, a group ID field indicating a vendor specific nested IE, a type field indicating a payload IE, and the content field. The content field of the RFM 910 may include a first round-trip time field and a reply time list field.

The first round-trip field may include information about a round-trip time with respect to a first responder anchor device from among a plurality of responder anchor devices transmitting the RRM. The round-trip time with respect to the first responder anchor device may denote a time interval between a time point at which the initiator anchor device transmits the RIM and a time point at which the initiator anchor device receives the RRM from the first responder anchor device. The first round-trip time field may be composed of 32 bits.

The RFM 910 may include only the round-trip time with respect to the first responder anchor device and may not include round-trip time information with respect to other responder anchor devices. Round-trip time information of the initiator anchor device with respect to other responder anchor devices may denote time intervals between the time point at which the initiator anchor device transmits the RIM and time points at which the initiator anchor device receives the RRM from the other responder anchor devices. In this case, the electronic device may calculate the round-trip time information of the initiator anchor device with respect to the other responder anchor devices, based on the round-trip time of the initiator anchor device with respect to the first responder anchor device and a reply time of the initiator anchor device with respect to the other responder anchor devices.

When the reply time list field includes N reply time elements, the reply time list field may be composed of 48*N bits. The reply time list field may include a reply time element for each responder anchor device participating in the ranging.

The content field of the RFM is not limited to the example illustrated in FIG. 9A and may further include a message control field.

The message control field may indicate a structure of a message. The message control field may include information about whether a hopping mode is used, whether a round index field is present in the message, and a length of the reply time list.

Figure 9B:
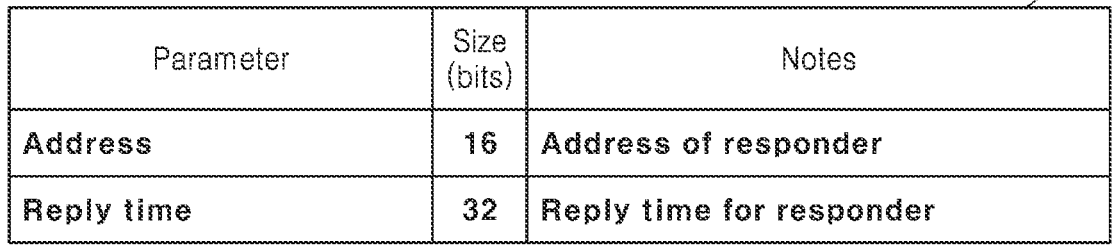
FIG. 9B illustrates a format of a reply time list element included in a final message, according to an embodiment.

FIG. 9B illustrates a format of the reply time list element 920 included in the final message, according to an embodiment.

As illustrated in FIG. 9B, one reply time list element 920 included in the reply time list field may include an address field and a reply time field and may be composed of 32 bits.

The address field may indicate an address for identifying each responder anchor device and may include MAC address information of each responder anchor device.

The reply time field may include reply time information of the initiator anchor device with respect to a responder anchor device indicated by the address field. The reply time of the initiator anchor device with respect to the responder anchor device may correspond to a time interval between a time point at which the initiator anchor device receives the RRM from a corresponding responder anchor device and a time point at which the initiator anchor device transmits the RFM to the corresponding responder anchor device.

FIGS. 7A and 7B described above illustrate an example in which the positioning system includes no backend controller, and the initiator anchor device transmits the RIM by including the scheduling information. However, the disclosure is not limited thereto. The positioning system may include a backend controller configured to manage the scheduling information.

Figure 10:
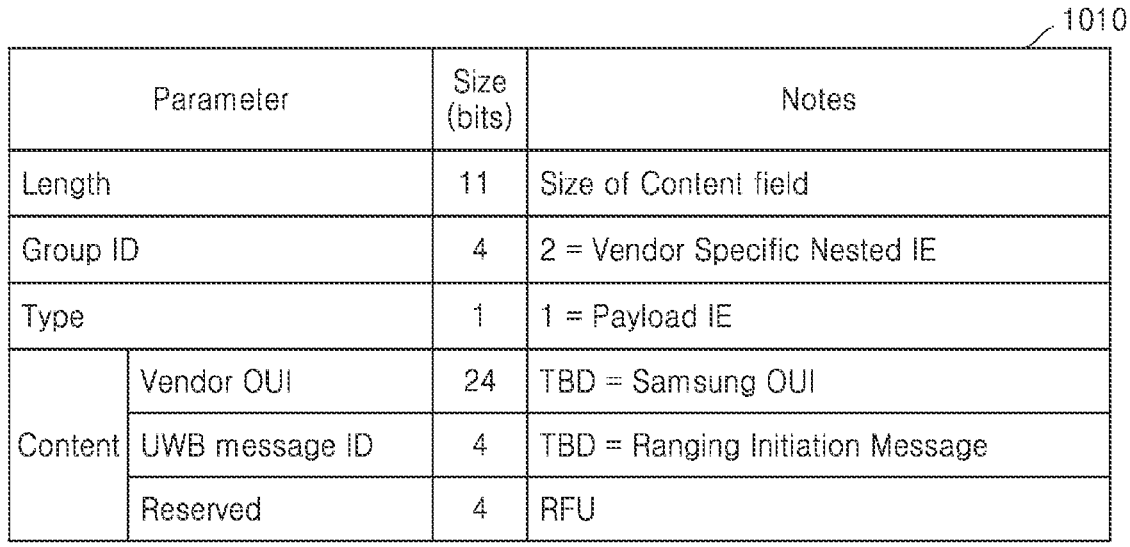
FIG. 10 illustrates a format of an initiation message transmitted by an initiator anchor device in a positioning system including a backend controller, according to an embodiment.

FIG. 10 illustrates a format of an initiation message 1010 transmitted by an initiator anchor device of a positioning system including a backend controller, according to an embodiment.

As illustrated in FIG. 10, a payload IE of a first message (that is, an RIM) 1010 transmitted by the initiator anchor device may be composed of 6 bytes, that is 48 bits.

The RIM 1010 may include a length field indicating a size of a content field, a group ID field indicating a vendor specific nested IE, a type field indicating a payload IE, and the content field. Compared with the RIM 710 illustrated in FIG. 7A, the content field of the RIM 1010 illustrated in FIG. 10 may not include the ranging device management list length field and the ranging device management list field. In the positioning system, in which the backend controller manages a ranging schedule, the initiator anchor device may not be required to transmit an RIM including scheduling information with respect to a responder anchor device.

The positioning system including the backend controller may operate as below.

The initiator anchor device may initiate a ranging operation by transmitting an RIM that is scheduled by the backend controller. All responder anchor devices may identify whether the responder anchor devices have to transmit an RRM and slots to be used to transmit the RRM, by referring to the information notified by the backend controller. First example, the RIM may have the format illustrated in FIG. 10.

The responder anchor device having received the RIM may transmit an RRM based on the information notified by the backend controller. For example, the RRM may have the format illustrated in FIG. 8.

The initiator anchor device having received the RRM may finish the ranging by transmitting an RFM that is scheduled by the backend controller. For example, the RFM may have the format illustrated in FIGS. 9A and 9B.

An electronic device may overhear the transmitted RIM, RRM, and RFM and may determine a TDoA curve. With respect to signals received from three or more anchor devices, the electronic device may obtain a TDoA result by repeatedly performing the calculation process illustrated in FIG. 5C. The electronic device may obtain relative locations of the electronic device with respect to the anchor devices, based on the TDoA result.

An application installed in the electronic device may obtain a location of the electronic device based on the TDoA result. The application installed in the electronic device may identify each anchor device related to the message through MAC information address included in the message.

When the electronic device positioning system does not include an external common clock, compensation for an error due to a clock drift between the anchor devices may be needed. An error due to a clock drift between the initiator anchor device and the responder anchor device may cause a significant error in a TDoA result. To minimize the TDoA error, the responder anchor device may have to compensate for the error due to the clock drift. Hereinafter, a method of compensating for the error due to the clock drift between the anchor devices will be described in detail by referring to FIGS. 11A, 11B, and 12.

Figures 11A, 11B:
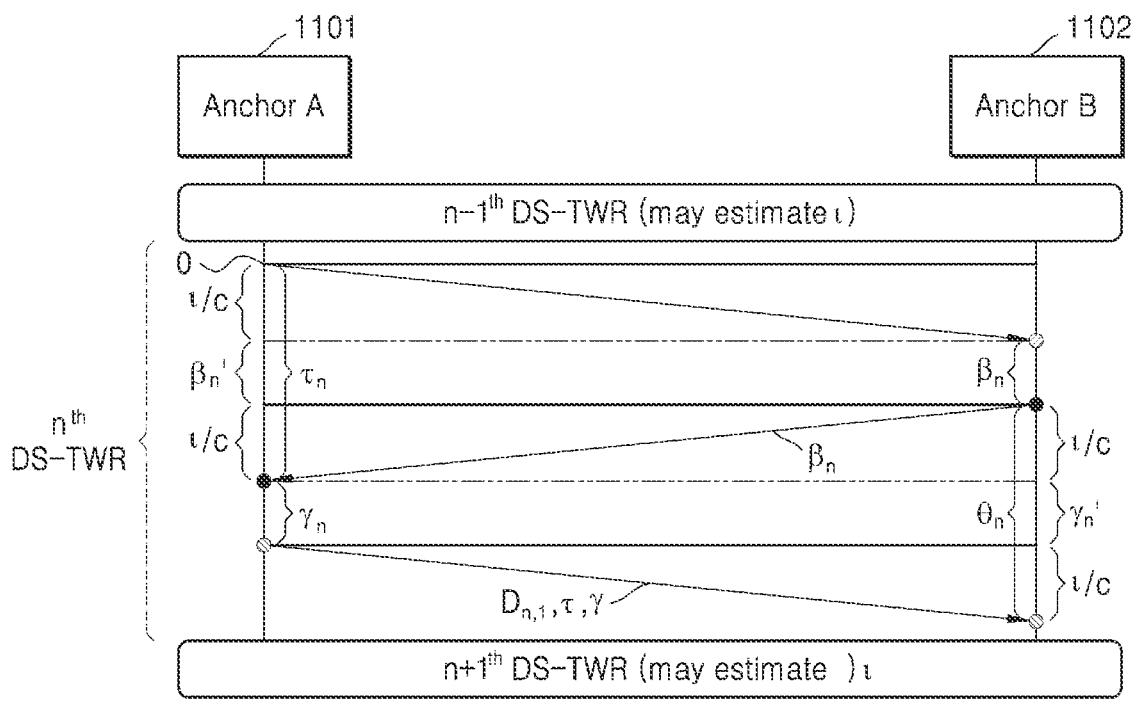
FIG. 11A illustrates information used to compensate for an error due to a clock drift between anchor devices, according to an embodiment.
FIG. 11B illustrates information used to compensate for an error due to a clock drift between anchor devices, according to an embodiment.

FIG. 11A illustrates information used to compensate for the error due to the clock drift between the anchor devices, according to an embodiment.

Hereinafter, for convenience of explanation, it will be described assuming that an electronic device positioning system includes anchor device A, anchor device B, and an electronic device (or a mobile device), as illustrated in FIG. 5A.

Anchor device B 1102 operating as a responder may use a variable $\rho_n$ to compensate for an error due to a clock drift between anchor device B 1102 and anchor device A 1101 operating as an initiator. The variable $\rho_n$ may be updated when DS-TWR of an $n^{th}$ ranging round is finished. Anchor device B 1102 may use the variable $\rho_n$ during DS-TWR of an $n+1^{th}$ ranging round.

In FIG. 11A, l may indicate a distance between anchor device A 1101 and anchor device B 1102. FIG. 11A illustrates an operation of estimating the distance l between anchor device A 1101 and anchor device B 1102, via anchor device A 1101 and anchor device B 1102 repeatedly performing DS-TWR.

In FIG. 11A, $\tau_n$ may indicate a first round-trip time measured in the $n^{th}$ DS-TWR performed between anchor device A 1101 and anchor device B 1102. The first round-trip time may correspond to a time interval between a time point at which anchor device A 1101 transmits a first message to anchor device B 1102 and a time point at which anchor device A 1101 receives a second message from anchor device B 1102.

$\beta_n$ may indicate a first reply time of anchor device B 1102 that is measured by anchor device B 1102 in the $n^{th}$ DS-TWR. The first reply time may correspond to a time interval between a time point at which anchor device B 1102 receives the first message from anchor device A 1101 and a time point at which anchor device B 1102 transmits the second message to anchor device A 1101. $\beta_{n'}$ may indicate a first reply time of anchor device B 1102 that is measured by anchor device A 1101 in the $n^{th}$ DS-TWR.

$\gamma_n$ may indicate a second reply time of anchor device A 1101 that is measured by anchor device A 1101 in the $n^{th}$ DS-TWR. The second reply time may correspond to a time interval between the time point at which anchor device A 1101 receives the second message from anchor device B 1102 and a time point at which anchor device A 1101 transmits a third message to anchor device B 1102. $\gamma_{n'}$ may indicate a second reply time of anchor device A 1101 that is measured by anchor device B 1102 in the $n^{th}$ DS-TWR.

$\theta_n$ may indicate a second round-trip time measured in the $n^{th}$ DS-TWR. The second round-trip time may correspond to a time interval between the time point at which anchor device B 1102 transmits the second message to anchor device A 1101 and a time point at which anchor device B 1102 receives the third message from anchor device A 1101.

To compensate for an error due to a clock drift between the anchor devices and measure a distance between anchor device A 1101 and anchor device B 1102, the third message transmitted by anchor device A 1101 may include $\tau_n$ and $\gamma_n$. The second message transmitted by anchor device B 1102 may include the first reply time $\beta_n$ measured by anchor device B 1102. When $\beta_n$ is a value measured via a clock of anchor device B 1102, $\beta_{n'}$ of FIG. 11A may be a value corresponding to $\beta_n$, which is measured via a clock of anchor device A 1101. When $\gamma_n$ is a value measured via the clock of anchor device A 1101, $\gamma_{n'}$ may be a value corresponding to $\gamma_n$, which is measured via the clock of anchor device B 1102. As illustrated in FIG. 11B, $\beta_{n'}$ may be estimated as $\tau_n-2*l/c$, $\beta_{n'}=\tau_n-2*l/c$. $\gamma_{n'}$ may be estimated as $\theta_n-2*l/c$, $\gamma_{n'}=\theta_n-2*l/c$.

Referring to a detailed calculation process 1105 in FIG. 11B, a drift difference between the clocks of anchor device A 1101 and anchor device B 1102 may be estimated as $D_{n,1}=\beta_{n'}/\beta_n$ and $D_{n,2}=\gamma_{n'}/\gamma_n$.

An electronic device may use an error $D_{n,1}$ due to a clock drift to compensate for the value $\beta$ measured during every DS-TWR. $D_{n,1}$ may be a drift difference calculated by using data obtained during the $n^{th}$ DS-TWR. $D_{n,1}$ and $D_{n,2}$ may indicate the error due to the clock drift between anchor device B 1102 and anchor device A 1101 and may be used for both synchronization between the anchor devices and synchronization between the anchor devices and the electronic device. The synchronization accuracy may be enhanced through Kalman filter or harmonic mean. For example, an average of drift differences, $\rho_n=2/(1/D_{n,1}+1/D_{n,2})$ or $\rho_n=Kalman(D_{n,1}, D_{n,2})$, may be used as an estimated drift error.

As described above, an error due to a drift between the clocks of anchor device A 1101 and anchor device B 1102 may be compensated for by using the time interval $\tau_n$ between the time point at which anchor device A 1101 transmits the first message to anchor device B 1102 and the time point at which anchor device A 1101 receives the second message from anchor device B 1102. An offset between the clocks of anchor device A 1101 and anchor device B 1102 may be compensated for by using the time interval $\theta_n$ between the time point at which anchor device B 1102 transmits the second message to anchor device A 1101 and the time point at which anchor device B 1102 receives the third message from anchor device A 1101. As illustrated in FIG. 11B, $\gamma_{n'}$ may be calculated based on Equation [4], as follows:

$$\theta_n-l/c-l/c=\theta_n-2*l/c \qquad [4]$$

Thus, in calculating the distance difference b-a between the anchor devices 502 and 503 and the electronic device 501 in the equation illustrated in FIG. 5C, a measured value in which the error due to a drift of the clock of anchor device B 1102 with respect to the clock of anchor device A 1101 is compensated for, may be used. For example, in calculating the distance difference b-a by using the values measured through the $n^{th}$ DS-TWR, a compensated value $\beta_n*D_n$ or $\beta_n*\rho_{n-1}$ may be used, rather than the value of $\beta$, in the Equation illustrated in FIG. 5C.

For example, an electronic device may calculate $\beta_n * D_n$ after receiving $D_n$ through the third message (for example, the final message) of anchor device A 1101.

As another example, after the electronic device receives $\rho_{n-1}$ that is previously calculated through the second message (for example, the response message) of anchor device B 1102, the electronic device may receive the third message (for example, the final message) of anchor device A 1101 and then may calculate $\beta_n * \rho_{n-1}$.

Figure 12:
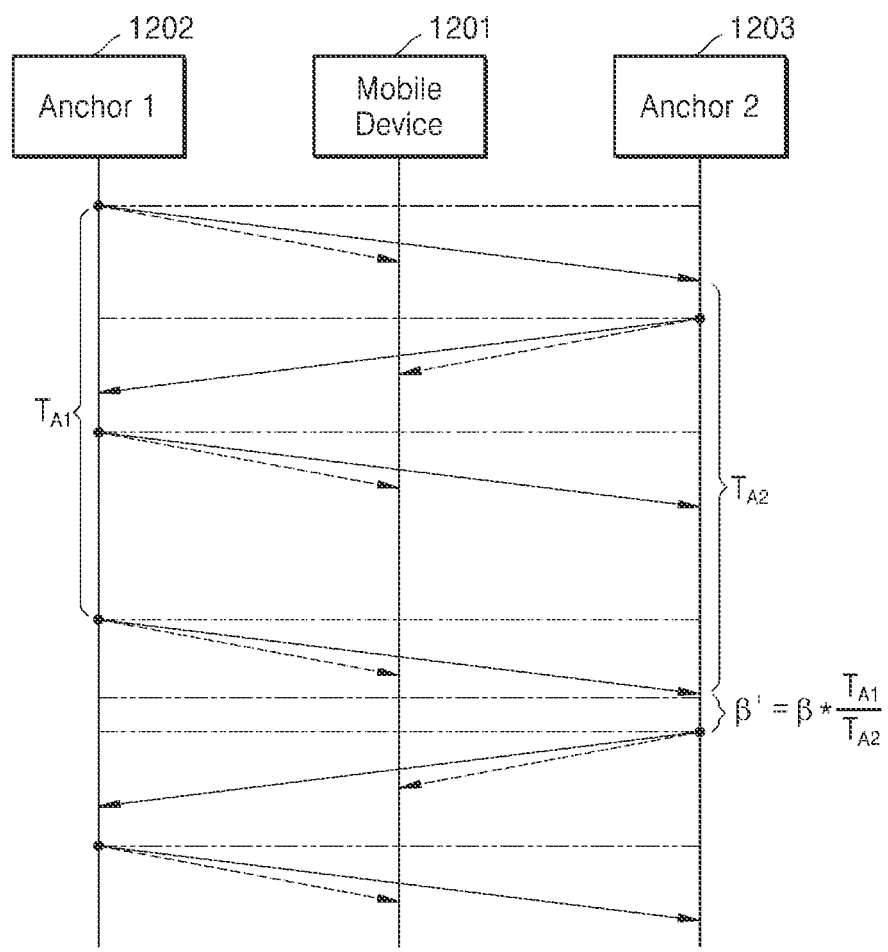
FIG. 12 illustrates information used to compensate for an error due to a clock drift between anchor devices, according to an embodiment.

FIG. 12 illustrates information used to compensate for an error due to a clock drift between anchor devices, according to an embodiment.

In FIG. 12, anchor device 2 1203 performing a responder role may update a reply time measurement value β aligned in anchor device 1 1202 performing an initiator role. A RIM interval may indicate a time interval between RIM frames and may be a value configured while anchor devices are deployed. Anchor device 1 1202 and anchor device 2 1203 may have to know the RIM interval to perform a TDoA method. Thus, anchor device 1 1202 anchor device 2 1203 may measure the RIM interval by using clocks of anchor device 1 1202 and anchor device 2 1203.

$T_{A1}$ and $T_{A2}$ may be RIM intervals measured by anchor device 1 1202 and anchor device 2 1203, respectively. A ratio between $T_{A1}$ and $T_{A2}$ may indicate a difference between the clocks of anchor device 1 1202 and anchor device 2 1203. Thus, anchor device 2 1203 may transmit an RRM including a reply time $\beta'=\beta*(T_{A1}/T_{A2})$ in which an error due to the clock drift between anchor device 1 1202 and anchor device 2 1203 is compensated for.

To the ranging messages (for example, the RIM, the RRM, and the RFM), location information of anchor devices, which is required to position the electronic device, may be added. For example, the location information of an initiator anchor device may be included in the RIM or the RFM, and the location information of a responder anchor device may be included in the RRM.

FIG. 13 illustrates a format of an initiation message 1310 transmitted by an initiator anchor device, according to an embodiment.

As illustrated in FIG. 13, a payload IE of an RIM 1310 transmitted by the initiator anchor device may be composed of 6+3*N bytes, that is 48+24*N bits.

The RIM 1310 may include a length field indicating a size of a content field, a group ID field indicating a vendor specific nested IE, a type field indicating a payload IE, and the content field.

Compared to the RIM 710 illustrated in FIG. 7A, the content field of the RIM 1310 illustrated in FIG. 13 may further include an information of initiator field. The information of initiator field may indicate location information of the initiator anchor device. For example, the location information of the initiator anchor device may include a global positioning system (GPS) value, information about a floor of a building, an absolute location value in a building, etc. With respect to other parameters except for the information of initiator field, the descriptions of FIGS. 7A and 7B may be applied, and thus, repeated descriptions will not be given.

FIG. 14 illustrates a format of a response message 1410 transmitted by a responder anchor device, according to an embodiment.

As illustrated in FIG. 14, a payload IE of an RRM 1410 transmitted by the responder anchor device may be composed of 10 bytes, that is 80 bits.

The ranging response message 141 may include a length field indicating a size of a content field, a group ID field indicating a vendor specific nested IE, a type field indicating a payload IE, and the content field.

Compared to the RRM 810 illustrated in FIG. 8, the content field of the RRM 1410 illustrated in FIG. 14 may further include an information of responder field. The information of responder field may indicate location information of the responder anchor device. For example, the location information of the responder anchor device may include a GPS value, information about a floor of a building, an absolute location value in a building, etc. With respect to other parameters except for the information of responder field, the descriptions of FIG. 8 may be applied, and thus, repeated descriptions will not be given.

FIG. 15 illustrates a format of a final message 1510 transmitted by the initiator anchor device, according to an embodiment.

As illustrated in FIG. 15, a payload IE of an RFM 1510 transmitted by the initiator anchor device may be composed of 10+6*N bytes, that is 80+48*N bits.

The RFM 1510 may include a length field indicating a size of a content field, a group ID field indicating a vendor specific nested IE, a type field indicating a payload IE, and the content field.

Compared to the RFM 810 illustrated in FIG. 9A, the content field of the RFM 1510 illustrated in FIG. 15 may further include an information of initiator field. The information of initiator field may indicate location information of the initiator anchor device. For example, the location information of the initiator anchor device may include a GPS value, information about a floor of a building, an absolute location value in a building, etc. With respect to other parameters except for the information of initiator field, the descriptions of FIGS. 9A and 9B may be applied, and thus, repeated descriptions will not be given.

As described above, the electronic device may calculate the location of the electronic device, based a result of receiving the RIM from the initiator anchor device, receiving, from the plurality of responder anchor devices, the RRMs generated in response to the RIM, and receiving, from the initiator anchor device, the RFM generated in response to the RRMs from the plurality of responder anchor devices.

Thus, when the electronic device does not seamlessly receive the messages from the initiator anchor device (for example, when there is an obstacle between the electronic device and the initiator anchor device so that a line of sight (LOS) is not obtained), it may become difficult for the electronic device to obtain the location information thereof. Thus, a method is provided, whereby the electronic device may obtain the location information thereof without depending on the reception of messages from the master anchor device or the initiator anchor device.

The electronic device may receive ranging messages from a plurality of anchor devices and measure a TDoA. To determine a 2D location, the electronic device may receive the ranging messages from more than four anchor devices and measure the TDoA. The electronic device may estimate the location thereof, based on the measured TDoA and notified locations of the anchor devices. Hereinafter, for convenience of explanation, an example in which an electronic device observes signal exchanges among four anchor devices will be described. However, the disclosure is not limited to the description below. In order for the electronic device identifies a 3D location thereof, signal exchanges among at least five anchor devices may have to be required.

FIG. 16 is a method of an electronic device, according to an embodiment.

In step S1610, the electronic device may receive a first message from a first anchor device. The first anchor device may unicast, multicast, or broadcast the first message.

In step S1620, the electronic device may receive a second message from a second anchor device. The second anchor device may unicast, multicast, or broadcast the second message.

In step S1630, the electronic device may receive a third message from a third anchor device. The third anchor device may unicast, multicast, or broadcast the third message.

In step S1640, the electronic device may receive a fourth message from a fourth anchor device. The fourth anchor device may unicast, multicast, or broadcast the fourth message.

For example, when the first anchor device is an initiator anchor device, the second through fourth anchor devices may respectively transmit the second through fourth messages in response to the first message transmitted by the first anchor device. However, the disclosure is not limited thereto. The first through fourth anchor devices may transmit the first through fourth messages in response to an RIM received from an additional initiator anchor device.

In step S1650, the electronic device may obtain location information of the electronic device, based on time points at which the electronic device receives the first through fourth messages.

The first through fourth messages may be transmitted in a predetermined slot interval. Thus, the electronic device may obtain the location information of the electronic device, based on the time points at which the electronic device respectively receives the first through fourth messages from the first through fourth anchor devices, by further considering location information of the first through fourth anchor devices and the slot interval.

The electronic device may receive location information of at least one anchor device and may obtain the location information of the electronic device based on the received location information of the at least one anchor device. The electronic device may measure a TDoA with respect to the anchor devices based on the time points at which the electronic device receives the messages from the anchor devices, the location information of the anchor devices, and the slot interval in which the messages are transmitted, and the electronic device may obtain the location information of the electronic device based on the measured TDoA.

To ensure accurate ranging, compensation of a clock drift among the anchor devices may be performed. Based on a clock of one of the first through fourth anchor devices, the remaining anchor devices may compensate for the clock drift or an error due to the clock drift. For example, the second anchor device, the third anchor device, and the fourth anchor device may compensate for their clocks based on the clock of the first anchor device and may transmit the second message, the third message, and the fourth message, respectively, based on the compensated clocks.

Slot timing synchronization among the anchor devices may be performed. Based on a slot timing of one of the first through fourth anchor devices, the remaining anchor devices may calculate their message transmission timings.

For example, the first anchor device may transmit the first message in a first slot, and the second anchor device may transmit the second message in a second slot. Here, based on the slot timing synchronization between the first anchor device and the second anchor device, the second anchor device may transmit the second message after one slot interval from a time point at which the first anchor device transmits the first message. For example, when the first anchor device transmits the first message at a starting time point of the first slot, the second anchor device may transmit the second message at a starting time point of the second slot, which is the next slot to the first slot. The anchor devices other than the second anchor device may also transmit the messages at starting time points of assigned slots, based on the message transmission timing (or the slot timing) of the first anchor device.

For the accurate ranging, not only compensation for an error due to a clock drift among the anchor devices, but also compensation for an error due to a clock drift between the electronic device and the anchor devices may have to be performed. Thus, the electronic device may obtain a difference between a clock of the first anchor device and a clock of the electronic device and may compensate for a measured value based on the obtained difference between the clocks. Accordingly, the electronic device may obtain the location information, in which an error due to the clock drift is compensated for.

Figure 17:
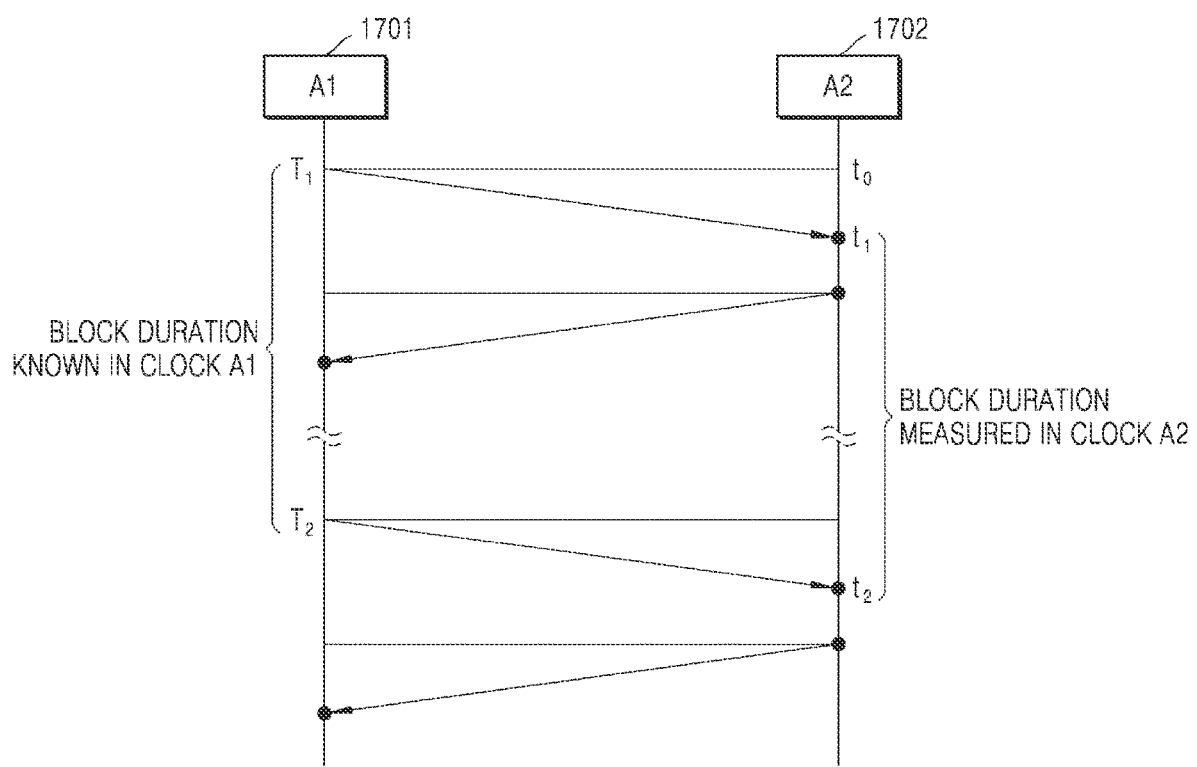
FIG. 17 illustrates a compensation operation performed between anchor devices, according to an embodiment.

FIG. 17 illustrates a compensation operation performed between first and second anchor devices 1701 and 1702, according to an embodiment.

As illustrated in FIG. 17, the compensation may be performed between the first anchor device 1701 and the second anchor device 1702. However, the disclosure is not limited to the example illustrated in FIG. 17. Other anchor devices except for the second anchor device 1702 may perform compensation based on the first anchor device 1701.

The second anchor device 1702 may compensate for an error due to a clock drift based on a ranging block duration that is measured.

In FIG. 17, $T_1$ may indicate a time point at which the first anchor device 1701 transmits a message in a predetermined ranging block, and $t_1$ may indicate a time point at which the second anchor device 1702 receives the corresponding message, the time point being measured by the second anchor device 1702. $T_2$ may indicate a time point at which the first anchor device 1701 transmits a message in a ranging block next to the predetermined ranging block, and $t_2$ may indicate a time point at which the second anchor device 1702 receives the corresponding message, the time point being measured by the second anchor device 1702. Thus, $T_2-T_1$ may be a block duration that is known in a clock of the first anchor device 1701, and $t_2-t_1$ may be a block duration that is measured in a clock of the second anchor device 1702.

An error due to a clock drift between the first anchor device 1701 and the second anchor device 1702 illustrated in FIG. 17 may be estimated as $(T_2-T_1)/(t_2-t_1)=R$, and the estimated value R may be used by the second anchor device 1702 to compensate for the error due to the clock drift.

The second anchor device 1702 may determine a message transmission timing of the second anchor device 1702 based on a slot timing of the first anchor device 1701.

In order to determine the message transmission timing, the second anchor device 1702 may calculate time of flight (ToF) between the first anchor device 1701 and the second anchor device 1702 by dividing a distance l between the first anchor device 1701 and the second anchor device 1702 by a signal transmission speed c. The second anchor device 1702 may determine a starting time point $t_0$ of a first slot, which is the time point at which the first message is transmitted, by subtracting the ToF (l/c) between the first anchor device 1701 and the second anchor device 1702 from the time point $t_1$ in which the second anchor device 1702 receives the first message from the first anchor device 1701. The second anchor device 1702 may determine a starting time point of a second slot to transmit a second message by adding a predetermined slot interval to the starting time point $t_0$ of the first slot.

The anchor devices may transmit messages with a predetermined slot interval after the compensation between the anchor devices is completed as described with reference to FIG. 17. An electronic device may obtain location information of the electronic device based on message received from the anchor devices, with respect to which compensation is completed.

Figure 18A:
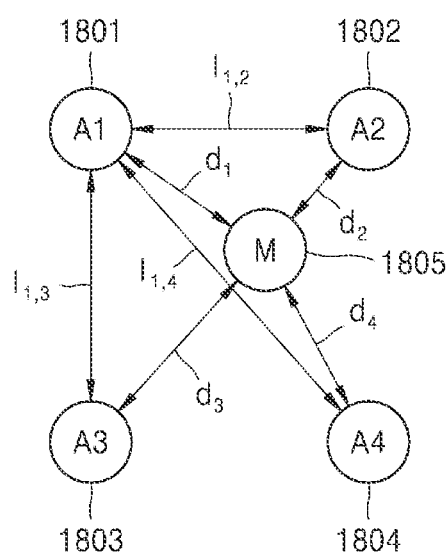
FIG. 18A illustrates configurations of an electronic device positioning system according to an embodiment.

FIG. 18A illustrates configurations of an electronic device positioning system according to an embodiment.

The electronic device positioning system in FIG. 18A may include a first anchor device 1801, a second anchor device 1802, a third anchor device 1803, a fourth anchor device 1804, and an electronic device (such as a mobile device) 1805.

In FIG. 18A, $l_{1,2}$ may indicate a distance between the first anchor device 1801 and the second anchor device 1802, $l_{1,3}$ may indicate a distance between the first anchor device 1801 and the third anchor device 1803, and $l_{1,4}$ may indicate a distance between the first anchor device 1801 and the fourth anchor device 1804. $d_1$ may indicate a distance between the first anchor device 1801 and the electronic device 1805, $d_2$ may indicate a distance between the second anchor device 1802 and the electronic device 1805, $d_3$ may indicate a distance between the third anchor device 1803 and the electronic device 1805, and $d_4$ may indicate a distance between the fourth anchor device 1804 and the electronic device 1805.

The electronic device 1805 may calculate a difference between the distance $d_1$ between the first anchor device 1801 and the electronic device 1805 and the distance $d_2$ between the second anchor device 1802 and the electronic device 1805, based on a difference between a time in which a signal transmitted from the first anchor device 1801 arrives at the electronic device 1805 and a time in which a signal transmitted from the second anchor device 1802 arrives at the electronic device 1805.

The electronic device 1805 may calculate a difference between a difference between the distance $d_1$ between the first anchor device 1801 and the electronic device 1805 and the distance $d_3$ between the third anchor device 1803 and the electronic device 1805, based on a difference between the time in which the signal transmitted from the first anchor device 1801 arrives at the electronic device 1805 and a time in which a signal transmitted from the third anchor device 1803 arrives at the electronic device 1805.

The electronic device 1805 may calculate a difference between the distance $d_1$ between the first anchor device 1801 and the electronic device 1805 and the distance $d_4$ between the fourth anchor device 1804 and the electronic device 1805, based on a difference between the time in which the signal transmitted from the first anchor device 1801 arrives at the electronic device 1805 and a time in which a signal transmitted from the fourth anchor device 1804 arrives at the electronic device 1805.

Figure 18B:
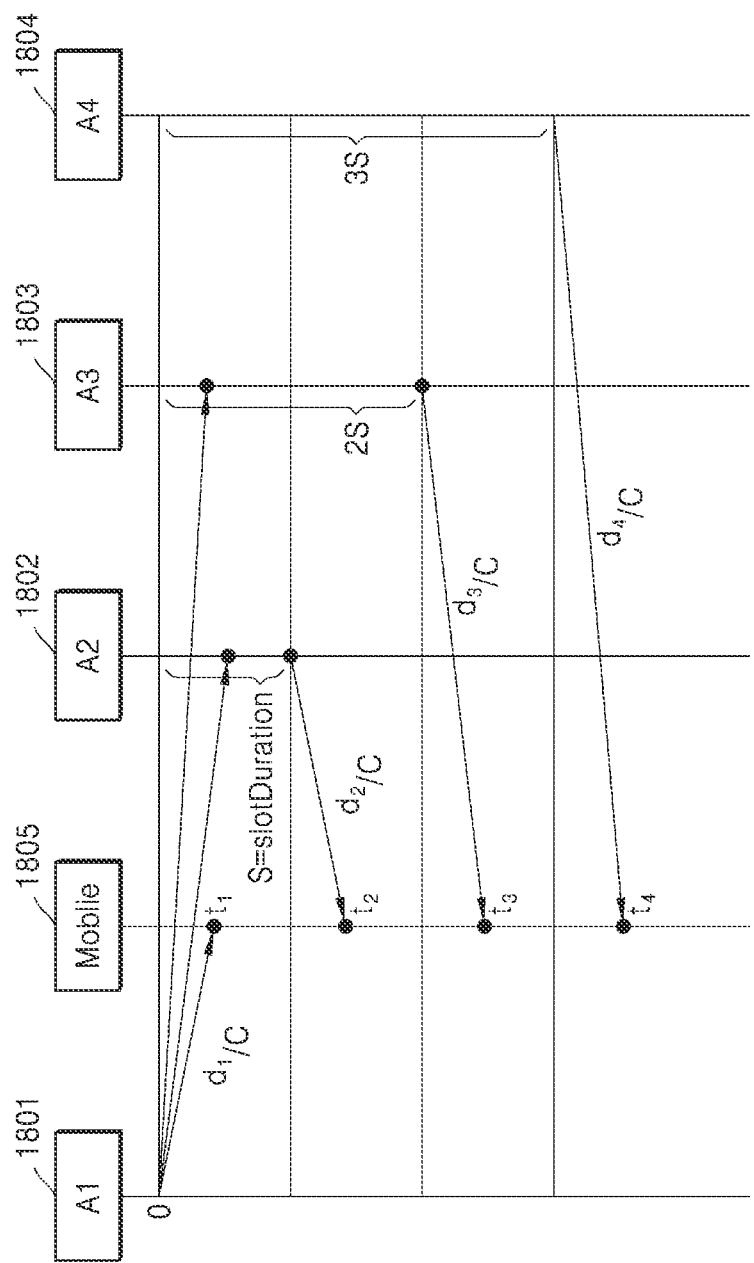
FIG. 18B illustrates information used by an electronic device to obtain location information of the electronic device with respect to anchor devices, according to an embodiment.

In FIGS. 18A through 18C, an example in which the electronic device 1805 calculates the TDoA with respect to the four anchor devices 1801, 1802, 1803, and 1804. However, embodiments are not limited thereto. The electronic device 1805 may identify a location of the electronic device 1805 based on a TDoA measured by observing signal exchanges among at least five anchor devices. In order for the electronic device 1805 to identify a 3D location of the electronic device 1805, information about TDoA among at least five anchor devices may have to be required.

FIG. 18B illustrates information used by the electronic device 1805 to obtain location information of the electronic device 1805 with respect to the first through fourth anchor devices 1801 through 1804, according to an embodiment of the disclosure.

As illustrated in FIG. 18B, each of the first through fourth anchor devices 1801 through 1804 may perform slot timing synchronization to transmit a message at a slot starting time point. In FIG. 18B, a slot duration may be indicated as S.

In a first slot, when a time point at which the first anchor device 1801 transmits a first message is 0, the electronic device 1805 may measure a time point at which the electronic device 1805 receives the first message as $t_1$. In a second slot, when a time point at which the second anchor device 1802 transmits a second message is S, the electronic device 1805 may measure a time point at which the electronic device 1805 receives the second message as $t_2$. In a third slot, when a time point at which the third anchor device 1803 transmits a third message is 2S, the electronic device 1805 may measure a time point at which the electronic device 1805 receives the third message as $t_3$. In a fourth slot, when a time point at which the fourth anchor device 1804 transmits a fourth message is 3S, the electronic device 1805 may measure a time point at which the electronic device 1805 receives the fourth message as $t_4$.

The electronic device 1805 may overhear the messages transmitted by the first through fourth anchor devices 1801 through 1804 and may determine a TDoA curve. The electronic device 1805 may obtain a TDoA result by performing a calculation process illustrated in FIG. 18C. The electronic device 1805 may obtain the location information of the electronic device 1805 based on the TDoA result.

FIG. 18C illustrates a detailed calculation process 1815 used by the electronic device 1805 to obtain the location information of the electronic device 1805 with respect to the first through fourth anchor devices 1801 through 1804, according to an embodiment As illustrated in FIG. 18C, when locations of the first through fourth anchor devices 1801 through 1804 are known and a location of the electronic device is yet to be estimated in the electronic device positioning system, the distances $d_1$, $d_2$, $d_3$, $d_4$ between the first through fourth anchor devices 1801 through 1804 and the electronic device 1805 and a clock drift R of the electronic device 1805 with respect to an initiator anchor device may be unknown values. The electronic device 1805 may compensate for a difference value between message reception time points and a predetermined slot interval based on a clock of the initiator anchor device by using an error R due to a clock drift of the electronic device 1805 with respect to the initiator anchor device, and may use the compensated values for measuring a TDoA.

The electronic device 1805 may derive a difference $d_2-d_1$ between the distance $d_1$ between the first anchor device 1801 and the electronic device 1805 and the distance $d_2$ between the second anchor device 1802 and the electronic device 1805, based on a difference $(t_2-t_1-S)*R$ between a time $t_1*R$ for which the first message is transmitted from the first anchor device 1801 to the electronic device 1805 and a time $(t_2-S)*R$ for which the second message is transmitted from the second anchor device 1802 to the electronic device 1805. As illustrated in FIG. 18C, it may be expressed as $(t_2-t_1-S)*R=(d_2-d_1)/c$.

The electronic device 1805 may derive a difference $d_3-d_1$ between the distance $d_1$ between the first anchor device 1801 and the electronic device 1805 and the distance $d_3$ between the third anchor device 1803 and the electronic device 1805, based on a difference $(t_3-t_1-2S)*R$ between the time $t_1*R$ for which the first message is transmitted from the first anchor device 1801 to the electronic device 1805 and a time $(t_3-2S)*R$ for which the third message is transmitted from the third anchor device 1803 to the electronic device 1805. As illustrated in FIG. 18C, the difference may be expressed as $(t_3-t_1-2S)*R=(d_3-d_1)/c$.

The electronic device 1805 may derive a difference $d_4-d_1$ between the distance $d_1$ between the first anchor device 1801 and the electronic device 1805 and the distance $d_4$ between the fourth anchor device 1804 and the electronic device 1805, based on a difference $(t_4-t_1-3S)*R$ between the time $t_1*R$ for which the first message is transmitted from the first anchor device 1801 to the electronic device 1805 and a time $(t_4-3S)*R$ for which the fourth message is transmitted from the fourth anchor device 1804 to the electronic device 1805. As illustrated in FIG. 18C, it may be expressed as $(t_4-t_1-3S)*R=(d_4-d_1)/c$.

Referring to FIG. 18C, in order to reduce the number of unknown variables, the distance $d_1$ between the first anchor device 1801 and the electronic device 1805 may be expressed by using location information $(x_1, y_1)$ of the first anchor device 1801 and location information $(x_m, y_m)$ of the electronic device 1805.

The distance $d_2$ between the second anchor device 1802 and the electronic device 1805 may be expressed by using location information $(x_2, y_2)$ of the second anchor device 1802 and the location information $(x_m, y_m)$ of the electronic device 1805. The distance $d_3$ between the third anchor device 1803 and the electronic device 1805 may be expressed by using location information $(x_3, y_3)$ of the third anchor device 1803 and the location information $(x_m, y_m)$ of the electronic device 1805. The distance $d_4$ between the fourth anchor device 1804 and the electronic device 1805 may be expressed by using location information $(x_4, y_4)$ of the fourth anchor device 1804 and the location information $(x_m, y_m)$ of the electronic device 1805.

Consequently, as illustrated in FIG. 18C, the electronic device 1805 may derive variables R, $x_m$, and $y_m$ from three new TDoA equations.

As described above, the electronic device may perform the TDoA operation according to various embodiments. That is, the electronic device may determine a TDoA method for performing ranging, based on messages received from anchor devices.

The electronic device may determine a method of obtaining location information of the electronic device, based on the number of messages received from a first anchor device and the total number of messages received from a plurality of anchor devices including the first anchor device. The first anchor device may be a master anchor device or an initiator anchor device. The electronic device may determine a method of obtaining the location information of the electronic device based on whether the number of messages received from the first anchor device is m (m is a natural number) and whether the total number of messages received from the plurality of anchor devices including the first anchor device is greater than or equal to n (n is a natural number), during one ranging round.

For example, for the electronic device to obtain 2D location information, the electronic device may determine the method of obtaining the location information of the electronic device based on whether the number of messages received from the first anchor device is 2 and whether the total number of messages received from the plurality of anchor devices including the first anchor device is greater than or equal to 4. As another example, for the electronic device to obtain 3D location information, the electronic device may determine the method of obtaining the location information of the electronic device based on whether the number of messages received from the first anchor device is 2 and whether the total number of messages received from the plurality of anchor devices including the first anchor device is greater than or equal to 5.

Figure 19:
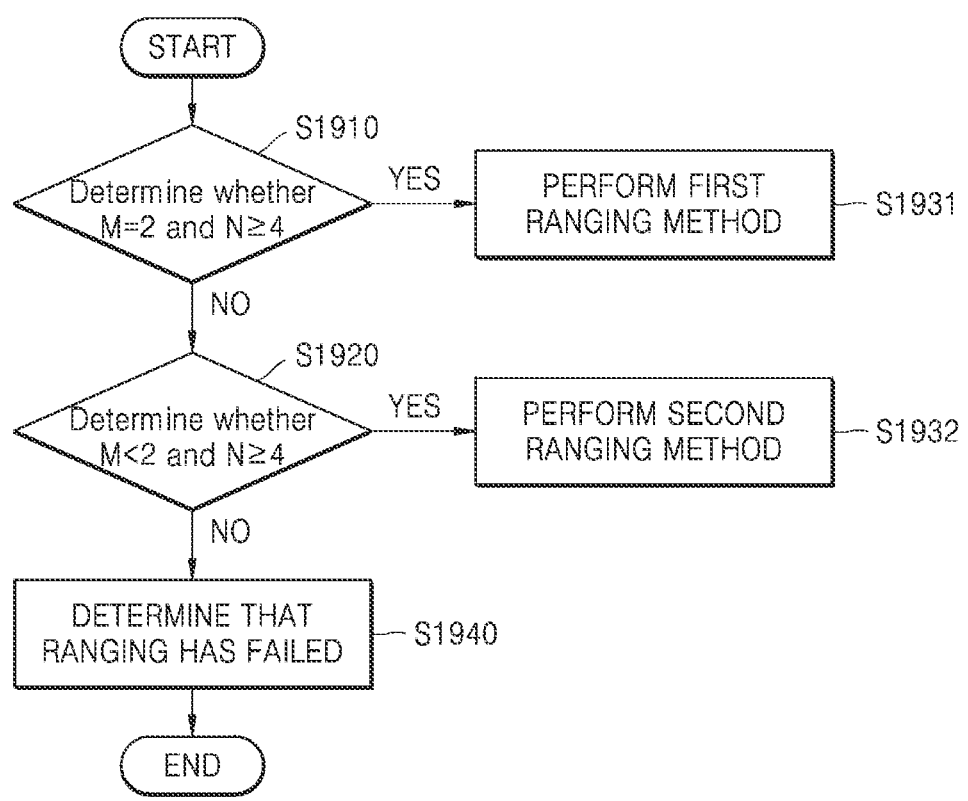
FIG. 19 is a method of an electronic device, according to an embodiment.

FIG. 19 is a method of an electronic device, according to an embodiment. FIG. 19 illustrates an example of a method performed by the electronic device to determine a method of obtaining 2D location information of the electronic device.

As illustrated in FIG. 19, in step S1910, the electronic device may determine whether the number M of messages received from a first anchor device is 2 and whether the total number N of messages received from a plurality of anchor devices including the first anchor device is greater than or equal to 4, during one ranging round.

When M is 2 and N is greater than or equal to 4, the electronic device may obtain the location information of the electronic device by using a first ranging method in step S1931. The first ranging method may be the TDoA algorithm described in detail with reference to FIGS. 4 through 15. According to the first ranging method, the electronic device may obtain the location information of the electronic device, based on a time point at which the electronic device receives an RIM from a first anchor device, a time point at which the electronic device receives RRMs from a second anchor device and a third anchor device, and a time point at which the electronic device receives an RFM from the first anchor device.

In step S1920, the electronic device may determine whether M is less than 2 and N is greater than or equal to 4.

When M is 2 and N is greater than or equal to 4, the electronic device may obtain the location information of the electronic device by using a second ranging method in step S1932. The second ranging method may be the TDoA algorithm described in detail with reference to FIGS. 16 through 18C. According to the second ranging method, the electronic device may obtain the location information of the electronic device based on time points at which the electronic device receives first through fourth messages respectively from first through fourth anchor devices.

When the number of messages received from the anchor devices during a ranging round is less than 4, the electronic device may determine that the ranging has failed, in step S1940.

FIG. 19 illustrates an example of the method performed by the electronic device to determine the method of obtaining the 2D location information of the electronic device. However, various embodiments are not limited to the example illustrated in FIG. 19. For example, for the electronic device according to an embodiment identifies 3D location information of the electronic device, the electronic device may determine whether the number M of messages received from the first anchor device is 2 and whether the total number N of messages received from the plurality of anchor devices including the first anchor device is greater than or equal to 5, in step S1910. The electronic device may determine whether M is less than 2 and N is greater than or equal to 5 in step S1920.

Figure 20:
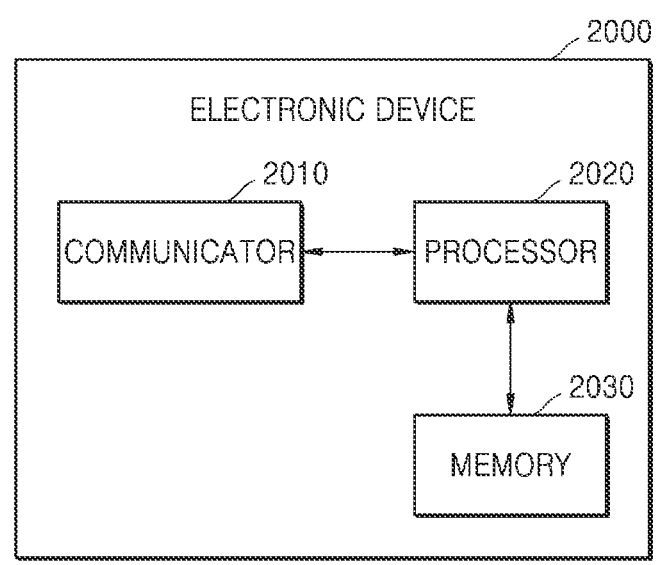
FIG. 20 is a block diagram of an electronic device according to an embodiment.

FIG. 20 is a block diagram of an electronic device 2000 according to an embodiment.

The electronic device 2000 according to various may include a stationary terminal or a mobile terminal, at least one of a smart phone, a navigation device, a computer, a digital broadcasting terminal, a smart home appliance device, an artificial intelligence (AI) speaker, a personal digital assistant (PDA), a portable multimedia player (PMP), a smart key, or a wearable device, but is not limited thereto. The electronic device 2000 may communicate with other devices and/or servers through a wireless or wired communication method.

Referring to FIG. 20, the electronic device 2000 may include a communicator 2010, a processor 2020, and a memory 2030. However, the electronic device 2000 may be realized by including additional or fewer components than those illustrated in FIG. 20.

FIG. 20 illustrates that the electronic device 2000 includes one processor. However, an embodiment is not limited thereto, and the electronic device 2000 may include a plurality of processors. Hereinafter, one or more operations and functions of the processor 2020 described below may be performed by a plurality of processors. The electronic device 2000 illustrated in FIG. 20 may perform the operating methods according to embodiments, and the descriptions with reference to FIGS. 2 through 19 may be applied to the electronic device 2000. Thus, the same aspects as described above will not be repeatedly described.

The communicator 2010 may perform wired or wireless communication with another device or a network. To this end, the communicator 2010 may include a communication module supporting at least one of various wired or wireless communication methods. For example, the communication module may be in the form of a chipset or may be a sticker/barcode (e.g. a sticker including a near-field communication (NFC) tag) including information required for communication.

The wireless communication may include at least one of cellular communication, wireless fidelity (Wi-Fi), Wi-Fi direct, Bluetooth™, ultra wide band (UWB), or NFC. The wired communication may include at least one of a universal serial bus (USB) or a high definition multimedia interface (HDMI).

The processor 2020 may execute a program stored in the memory 2030 to control general operations of the electronic device 2000 and may include at least one of processors, such as a central processing unit (CPU), a graphical processing unit (GPU), etc. The processor 2020 may control other components included in the electronic device 2000 in order to perform UWB ranging. With respect to a detailed method performed by the processor 2020 to control generation operations of the electronic device 2000 to perform positioning, the descriptions with reference to FIG. 4, 16, or 19 may be applied, and thus, repeated descriptions will not be given.

The processor 2020 may obtain location information of the electronic device 2000 by exchanging signals with a plurality of nearby anchor devices.

The processor 2020 may control the communicator 2010 to receive an initiation message transmitted from a first anchor device. The first anchor device transmitting the initiation message may be an initiator anchor device.

For example, a ranging system including the electronic device may not include a backend controller. The initiation message may include a slot index used by a second anchor device to transmit a response message as scheduling information. The initiation message may further include an address of at least one anchor device including the second anchor device.

As another example, a ranging system including the electronic device may include a backend controller. An initiation message, a response message, and a final message may be scheduled by the backend controller. Thus, the initiation message may not include a slot index.

The processor 2020 may control the communicator 2010 to receive information about a first reply time of the second anchor device from the second anchor device. The information about the first reply time may include information about a time interval between a time point at which the second anchor device receives the initiation message and a time point at which the second anchor device transmits the response message. The processor 2020 may control the communicator 2010 to receive the response message transmitted from the second anchor device in response to the initiation message.

For example, the response message may include the information about the first reply time of the second anchor device. As another example, the response message may include an STS and may not include the information about the first reply time. The information about the first reply time may be transmitted by being included in an additional message that is different from the response message.

The processor 2020 may control the communicator 2010 to receive, from the first anchor device, information about a second reply time with respect to the second anchor device. The information about the second reply time may include information about a time interval between a time point at which the first anchor device receives the response message and a time point at which the first anchor device transmits a final message. The processor 2020 may control the communicator 2010 to receive the final message transmitted from the first anchor device.

The final message may include the second reply time with respect to the second anchor device. As another example, the final message may include an STS and may not include the information about the second reply time. The information about the second reply time may be transmitted by being included in an additional message that is different from the final message.

The processor 2020 may control the communicator 2010 to further receive information about a round-trip time of the first anchor device.

The information about the round-trip time of the first anchor device with respect to the second anchor device may be transmitted by being included in the final message. However, the disclosure is not limited thereto, and the information about the round-trip time of the first anchor device with respect to the second anchor device may be transmitted by being included in an additional message that is different from the final message. The round-trip time of the first anchor device with respect to the second anchor device may denote a time interval between the time point at which the first anchor device transmits the initiation message and the time point at which the first anchor device receives the response message from the second anchor device.

The information about a round-trip time of the first anchor device with respect to the third anchor device may be transmitted by being included in the final message. However, the disclosure is not limited thereto, and the information about the round-trip time of the first anchor device with respect to the third anchor device may be transmitted by being included in an additional message that is different from the final message. The third anchor device may be an anchor device having transmitted the response message in response to the initiation message earliest from among a plurality of anchor devices having received the initiation message transmitted by the first anchor device. The round-trip time of the first anchor device with respect to the third anchor device may denote a time interval between the time point at which the first anchor device transmits the initiation message and a time point at which the first anchor device receives the response message from the third anchor device.

The processor 2020 may calculate a round-trip time of the first anchor device with respect to another anchor device by using the round-trip time of the first anchor device with respect to the third anchor device, a reply time of the first anchor device with respect to the third anchor device, and a reply time of the first anchor device with respect to the other anchor device. For example, the processor 2020 may calculate a round-trip time of the first anchor device with respect to the second anchor device by subtracting a reply time of the first anchor device with respect to the second anchor device from a sum of the round-trip time of the first anchor device with respect to the third anchor device and the reply time of the first anchor device with respect to the third anchor device.

The processor 2020 may obtain information about a difference between a first distance between the first anchor device and the electronic device and a second distance between the second anchor device and the electronic device. The electronic device may obtain location information of the electronic device based on the difference between the first distance and the second distance.

The processor 2020 may obtain the information about the difference between the first distance and the second distance, based on information about a time point at which at least one of the initiation message, the response message, or the final message is received, the information about the first reply time, and the information about the second reply time.

The processor 2020 may calculate a TDoA between a message arrival time from the first anchor device to the electronic device and a message arrival time from the second anchor device to the electronic device, in order to obtain the information about the difference between the first distance and the second distance.

The TDoA may be calculated based on the first reply time of the second anchor device, a time interval between a time point at which the electronic device receives the initiation message and a time point at which the electronic device receives the response message, the second reply time of the first anchor device, and a time interval between the time point at which the electronic device receives the response message and a time point at which the electronic device receives the final message.

In order to obtain the information about the difference between the first distance and the second distance, the processor 2020 may calculate the difference between the first distance and the second distance, by performing compensation based on a clock of at least one of the electronic device, the first anchor device, or the second anchor device.

The processor 2020 may obtain a TDoA result by transmitting and receiving signals not only between the first anchor device and the second anchor device, but also among three or more anchor devices. The processor 2020 may obtain relative locations with respect to the anchor devices, based on the TDoA result.

The electronic device 2000 may obtain the location information without relying on message reception from a master anchor device or an initiator anchor device.

The processor 2020 may receive the first message from the first anchor device, the second message from the second anchor device, the third message from the third anchor device, and the fourth message from the fourth anchor device. The processor 2020 may obtain the location information of the electronic device, based on time points at which the processor 2020 receives the first through fourth messages.

The processor 2020 may obtain the location information of the electronic device based on the time points at which the processor 2020 receives the first through fourth messages from the first through fourth anchor devices, by further considering location information and slot intervals of the first through fourth anchor devices. The processor 2020 may obtain the location information of the electronic device based on the time points at which the processor 2020 receives the first through fourth messages from the first through fourth anchor devices, the location information of the first through fourth anchor devices, and the slot intervals by which the first through fourth messages are transmitted.

A clock drift between the anchor devices or an error due to the clock drift may be compensated for based on a clock of one of the first through fourth anchor devices, the remaining anchor devices may compensate for a clock drift or an error due to the clock drift. For example, the second anchor device, the third anchor device, and the fourth anchor device may compensate for their clocks based on a clock of the first anchor device and may transmit the second message, the third message, and the fourth message, respectively, based on the compensated clocks.

Slot timing synchronization among the anchor devices may be performed.

According to an embodiment of the disclosure, based on a slot timing of one of the first through fourth anchor devices, the remaining anchor devices may calculate their message transmission timings, The first anchor device may transmit the first message in a first slot, and the second anchor device may transmit the second message in a second slot. Based on the slot timing synchronization between the first anchor device and the second anchor device, the second anchor device may transmit the second message after one slot interval from a time point at which the first anchor device transmits the first message. For example, when the first anchor device transmits the first message at a starting time point of the first slot, the second anchor device may also transmit the second message at a starting time point of the second slot. The anchor devices other than the second anchor device may also transmit the messages at starting time points of assigned slots, based on the message transmission timing (or the slot timing) of the first anchor device.

The processor 2020 may obtain a difference between a clock of the initiator anchor device (or the master anchor device) and a clock of the electronic device and compensate for a clock drift or an error due to the clock drift based on the obtained difference between the clocks of the initiator anchor device (or the master anchor device) and the electronic device.

The processor 2020 may receive location information of at least one anchor device and may obtain the location information of the electronic device based on the received location information of the at least one anchor device.

The electronic device 2000 may adaptively determine a TDoA algorithm for performing ranging, according to a communication status with the anchor devices.

The processor 2020 may determine a ranging method for obtaining location information of the electronic device, based on the number of messages received from a first anchor device and the total number of messages received from a plurality of anchor devices including the first anchor device. The first anchor device may be a master anchor device or an initiator anchor device.

For example, the processor 2020 may determine whether the number M of messages received from the first anchor device is 2 and whether the total number N of messages received from the plurality of anchor devices including the first anchor device is greater than or equal to 4, during one ranging round.

When M is 2 and N is greater than or equal to 4, the processor 2020 may obtain the location information of the electronic device by using a first ranging method. For example, according to the first ranging method, the electronic device may use a TDoA algorithm for obtaining the location information of the electronic device based on a time point at which the electronic device receives an RIM from the first anchor device, a time point at which the electronic device receives RRMs from a second anchor device and a third anchor device, and a time point at which the electronic device receives an RFM from the first anchor device.

However, when M is less than 2 and N is greater than or equal to 4, the processor 2020 may obtain the location information of the electronic device by using a second ranging method. For example, according to the second ranging method, the electronic device may use a TDoA algorithm for obtaining the location information of the electronic device based on time points at which the electronic device receives first through fourth messages respectively from the first through fourth anchor devices. When the number of messages received from the anchor devices during a ranging round is less than 4, the processor 2020 may determine that ranging has failed.

The embodiments described above may be realized as a software (S/W) program including instructions stored in computer-readable storage media.

A computer may be a device for calling the instructions stored in the storage media and performing, in response to the called instructions, operations according to the embodiments described above, and may include the electronic device according to the embodiments.

The computer-readable storage medium may be in the form of a non-transitory storage medium. The term "non-transitory" may only denote that a storage medium does not include a transitory electrical signal and is tangible, and may not distinguish between semi-permanent and temporary storage of data in the storage medium.

The electronic device or the method according to the embodiments may be included in a computer program product. The computer program product may be purchased as a product between a seller and a purchaser.

The computer program product may include an S/W program or a computer-readable storage medium in which the S/W program is stored. For example, the computer program product may include a product in the form of an S/W program (for example, a downloadable application) that is electronically distributed through a manufacturer of an electronic device or an electronic market (for example, a Google play store or an App store). For electronic distribution, at least a portion of the S/W program may be stored in a storage medium or temporarily generated. In this case, the storage medium may include a server of the manufacturer, a server of the electronic market, or a storage medium of a broadcasting server temporarily storing the S/W program.

The computer program product may include a storage medium of a server or a storage medium of a terminal in a system including the server and the terminal (for example, a ranging electronic device). Alternatively, when there is a third device (for example, a smartphone) connected to the server or the terminal for communication, the computer program product may include a storage medium of the third device. Alternatively, the computer program product may directly include an S/W program transmitted from the server to the terminal or the third device or transmitted from the third device to the terminal.

In this case, any one of the server, the terminal, and the third device may perform the method according to the embodiments by executing the computer program product. Alternatively, at least two of the server, the terminal, and the third device may perform the method according to the embodiments by executing the computer program product in a distributed fashion.

For example, the server (for example, a cloud server or an AI server) may execute a computer program product stored in the server to control the terminal connected to the server for communication to perform the methods according to the embodiments.

As another example, the third device may execute the computer program product to control the terminal connected to the third device for communication to perform the method according to the embodiments. As a detailed example, the third device may remotely control a ranging device to perform ranging.

When the third device executes the computer program product, the third device may download the computer program product from the server and execute the downloaded computer program product. Alternatively, the third device may execute the computer program product provided in a pre-loaded state to perform the method according to the embodiments.

While the disclosure has been particularly shown and described with reference to certain embodiments thereof, it will be understood by those skilled in the art that various changes in form and details may be made therein without departing from the scope of the subject matter as defined by the appended claims and their equivalents.

What is claimed is:

1. A method, performed by an electronic device, of obtaining location information, the method comprising:
receiving an initiation message transmitted from a first anchor device;
receiving a response message transmitted from a second anchor device, the response message including information about a first reply time of the second anchor device and information about a transmission time of the response message, the information about the first reply time comprising a time interval between a reception time of the initiation message by the second anchor device and the transmission time of the response message by the second anchor device;
receiving, from the first anchor device, a final message including information about a second reply time of the first anchor device and information about a transmission time of the final message, the information about the second reply time comprising a time interval between a reception time of the response message by the first anchor device and a transmission time point of the final message by the first anchor device;
measuring a reception time of the initiation message, a reception time of the response message and a reception time of the final message by the electronic device; and
obtaining information about a time difference of arrival (TDoA) related to the first device and the second device based on the measured reception time of the initiation message, the measured reception time of the response message and the measured reception time of the final message.

2. The method of claim 1,
wherein the initiation message comprises an address list including an address of the second anchor device.

3. The method of claim 2,
wherein the initiation message comprises a slot index.

4. The method of claim 1,
wherein the initiation message, the response message, and the final message are scheduled by a backend controller.

5. The method of claim 1,
wherein the final message further comprises a round-trip time of the first anchor device with respect to a third anchor device.

6. The method of claim 1, wherein the method further comprises:
calculating a difference between a first distance between the first anchor device and the electronic device and a second distance between the second anchor device and the electronic device based on the TDoA,
wherein the TDoA is calculated based on the first reply time of the second anchor device, a round-trip time of the first anchor device, a time interval between the reception time of the initiation message by the electronic device and the reception time of the response message by the electronic device, the second reply time of the first anchor device, and a time interval between the reception time of the response message by the electronic device and the reception time of the final message by the electronic device.

7. The method of claim 1, further comprising:
performing compensation based on a clock of one of the electronic device, the first anchor device, and the second anchor device.

8. The method of claim 1, further comprising:
performing compensation based on a ratio between an interval of transmitting the initiation message via the first anchor device, the interval being measured by using a clock of the first anchor device, and an interval of receiving, via the second anchor device, the initiation message from the first anchor device, the interval being measured by using a clock of the second anchor device.

9. The method of claim 1, further comprising receiving location information of at least one of the first anchor device or the second anchor device.

10. The method of claim 1,
wherein at least one of the initiation message or the final message transmitted from the first anchor device comprises location information of the first anchor device, and
wherein the response message transmitted from the second anchor device comprises location information of the second anchor device.

11. An electronic device comprising:
a communicator;
a memory; and
at least one processor configured to control an operation of the electronic device by executing a program stored in the memory,
wherein the communicator is configured to:
receive an initiation message transmitted form a first anchor device;
receive, from a second anchor device, a response message including information about a first reply time of the second anchor device and information about a transmission time of the response message, the information about the first reply time comprising a time interval between a reception time of the initiation message by the second anchor device and the transmission time of the response message by the second anchor device; and
receive, from the first anchor device, a final message including information about a second reply time of the first anchor device and information about a transmission time of the final message, the information about the second reply time comprising a time interval between a reception time of the response message by the first anchor device and a transmission time point of the final message by the first anchor device; and
wherein the at least one processor is configured to measure a reception time of the initiation message, a reception time of the response message and a reception time of the final message by the electronic device, and obtain information about a time difference of arrival (TDoA) related to the first device and the second device based on the measured reception time of the initiation message, the measured reception time of the response message and the measured reception time of the final message.

12. The electronic device of claim 11,
wherein the initiation message comprises an address list including an address of the second anchor device.

13. The electronic device of claim 12,
wherein the initiation message comprises a slot index.

14. The electronic device of claim 11,
wherein the initiation message, the response message, and the final message are scheduled by a backend controller.

15. The electronic device of claim 11,
wherein the final message further comprises a round-trip time of the first anchor device with respect to a third anchor device.

16. The electronic device of claim 11, wherein the at least one processor is further configured to:
calculate a difference between a first distance between the first anchor device and the electronic device and a second distance between the second anchor device and the electronic device based on the TDoA,
wherein the TDoA is calculated based on the first reply time of the second anchor device, a round-trip time of the first anchor device, a time interval between the reception time of the initiation message by the electronic device and the reception time of the response message by the electronic device, the second reply time of the first anchor device, and a time interval between the reception time of the response message by the electronic device and the reception time of the final message by the electronic device.

* * * * *

UNITED STATES PATENT AND TRADEMARK OFFICE
CERTIFICATE OF CORRECTION

| | |
|---|---|
| PATENT NO. | : 11,729,799 B2 |
| APPLICATION NO. | : 17/353220 |
| DATED | : August 15, 2023 |
| INVENTOR(S) | : Kangjin Yoon et al. |

Page 1 of 1

It is certified that error appears in the above-identified patent and that said Letters Patent is hereby corrected as shown below:

In the Claims

In Column 36, Line 2, in Claim 11:
"receive an initiation message transmitted form a first anchor device"
Should be:
-- receive an initiation message transmitted from a first anchor device --

Signed and Sealed this
Twenty-fourth Day of December, 2024

Derrick Brent
*Acting Director of the United States Patent and Trademark Office*